United States Patent

Saneto et al.

(10) Patent No.: US 9,417,477 B2
(45) Date of Patent: Aug. 16, 2016

(54) POLARIZING PLATE AND LIQUID CRYSTAL DISPLAY DEVICE

(71) Applicant: FUJIFILM Corporation, Tokyo (JP)

(72) Inventors: Ryuji Saneto, Kanagawa (JP); Fumitake Mitobe, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/605,163

(22) Filed: Jan. 26, 2015

(65) Prior Publication Data

US 2015/0146140 A1 May 28, 2015

Related U.S. Application Data

(63) Continuation of application No. PCT/JP2013/070056, filed on Jul. 24, 2013.

(30) Foreign Application Priority Data

Jul. 27, 2012 (JP) ................................ 2012-167653

(51) Int. Cl.
*G02F 1/1335* (2006.01)
*G02B 1/14* (2015.01)
(Continued)

(52) U.S. Cl.
CPC .......... *G02F 1/133528* (2013.01); *G02B 1/105* (2013.01); *G02B 1/14* (2015.01); *G02B 5/3033* (2013.01); *G02F 2001/133565* (2013.01); *G02F 2201/50* (2013.01); *Y10T 428/269* (2015.01)

(58) Field of Classification Search
None
See application file for complete search history.

(56) References Cited

U.S. PATENT DOCUMENTS

2006/0246232 A1  11/2006  Kubo et al.
2008/0143928 A1*  6/2008  Fukagawa ......... B32B 17/10018
                                                             349/96

(Continued)

FOREIGN PATENT DOCUMENTS

JP  2008-107499 A  5/2008
JP  2008-529038 A  7/2008

(Continued)

OTHER PUBLICATIONS

Decision of Refusal issued by the Japanese Patent Office on Mar. 24, 2015 in connection with Japanese Patent Application No. 2014/526975.

(Continued)

*Primary Examiner* — Derek S Chapel
(74) *Attorney, Agent, or Firm* — Jean C. Edwards, Esq; Edwards Neils LLC

(57) ABSTRACT

There is provided a polarizing plate including a first protective film, a polarizer, and a second protective film in this order, in which the first protective film is a film including a synthetic polymer, and has a thickness of 30 μm or less, an elastic modulus in the TD direction of 2 GPa to 2.5 GPa, and a humidity dimensional change rate in a TD direction of 0.1% or less, and the second protective film has an evaluation value represented by the following Equation (2) of 7.0 to 11.0: Evaluation value=elastic modulus (GPa) of the second protective film in a TD direction/humidity dimensional change rate (%) of the second protective film in the TD direction× (thickness (μm) of the second protective film/thickness (μm) of the first protective film)$^2$×(30/thickness (μm) of the polarizer)$^{1/2}$ Equation (2).

12 Claims, 5 Drawing Sheets

(51) Int. Cl.
  *G02B 1/10* (2015.01)
  *G02B 5/30* (2006.01)

(56) References Cited

U.S. PATENT DOCUMENTS

| | | |
|---|---|---|
| 2009/0316084 A1 | 12/2009 | Yajima et al. |
| 2010/0308264 A1 | 12/2010 | Furukawa et al. |
| 2012/0320316 A1 | 12/2012 | Yanai et al. |
| 2015/0062502 A1* | 3/2015 | Saneto .................. G02B 1/105 349/96 |

FOREIGN PATENT DOCUMENTS

| | | |
|---|---|---|
| JP | 2008-203400 A | 9/2008 |
| JP | 2009-198666 A | 9/2009 |
| JP | 2009-292869 A | 12/2009 |
| JP | 2012-018421 A | 1/2012 |
| KR | 2008-0027186 A | 3/2008 |
| WO | 2006/082818 A1 | 8/2006 |
| WO | 2007/069474 A1 | 6/2007 |

OTHER PUBLICATIONS

International Search Report issued in PCT/JP2013/070056 on Sep. 10, 2013.
Written Opinion issued in PCT/JP2013/070056 on Sep. 10, 2013.
Japanese Office Action issued on Nov. 18, 2014 in connection with Japanese Patent Application No. 2014-526975.
Notice of Grounds for Rejection issued by the Korean Intellectual Property Office on Nov. 2, 2015, in connection with Korean Patent Application No. 2015-7002254.

* cited by examiner

POLARIZING PLATE AND LIQUID CRYSTAL DISPLAY DEVICE

CROSS REFERENCE TO RELATED APPLICATION

This is a continuation of International Application No. PCT/JP2013/070056 filed on Jul. 24, 2013, which was published under PCT Article 21(2) in Japanese, and claims priority from Japanese Patent Application No. 2012-167653 filed on Jul. 27, 2012, the entire disclosures of all of which are incorporated herein by reference in their entirety.

TECHNICAL FIELD

The present invention relates to a polarizing plate and a liquid crystal display device.

BACKGROUND ART

A liquid crystal device is a space-saving image display device with low power consumption, and the use thereof is increasing every year. In the related art, the liquid crystal display device is largely disadvantageous in respect to large viewing angle dependence of a display image, but a wide viewing angle liquid crystal mode such as a VA mode and an IPS mode is being put into practice, and accordingly, the demand for a liquid crystal display device is rapidly spreading even on the market such as a television where a high-quality image such as television is required.

As the use of the liquid crystal display device is expanding, the liquid crystal display device has been required to have both a large size and a high-quality texture. The liquid crystal display device has a part corresponding to a frame called a bezel at a screen peripheral part, and the width of the bezel has been narrowed in order to allow the liquid crystal display device to have a high-quality texture. The bezel conceals end portions of a polarizing plate, and thus serves to aesthetically finish the display, and as the width of the bezel is narrowed, a high level has been required even for sticking accuracy of a liquid crystal cell and a polarizing plate.

The polarizing plate used in the liquid crystal display device generally has a configuration in which a polarizer composed of a polyvinyl alcohol film and the like, on which iodine or a dye is adsorbed and oriented is adhered to a transparent protective film (polarizing plate protective film) on the front and back sides of the polarizer. As the polarizing plate protective film, a cellulose acylate-based polarizing plate protective film represented by cellulose acetate has high transparency and may readily secure adhesion to polyvinyl alcohol used in the polarizer, and thus has been widely used. Adhesion is generally obtained by subjecting a protective film to saponification treatment to impart hydrophilicity to the surface thereof.

Further, as the polarizing plate protective film, a synthetic polymer film has also been used in addition to the cellulose acylate film.

Patent Document 1 discloses a polarizing plate which has, as protective films of a polarizer, a cycloolefin-based polymer film on one side of the polarizer and a cellulose acylate film on the other side thereof.

Patent Document 2 discloses a polarizing plate which has, as protective films of a polarizer, an acrylic film on one side of the polarizer and a cellulose acylate film on the other side thereof.

Patent Document 3 discloses a polarizing plate which has, as protective films of a polarizer, an acrylic film, a polyimide-based film or a norbornene-based film on one side of the polarizer and a cellulose acylate film on the other side thereof.

CITATION LIST

Patent Document

Patent Document 1: Japanese Unexamined Patent Application Publication No. 2008-529038
Patent Document 2: Japanese Patent Application Laid-Open No. 2009-292869
Patent Document 3: Japanese Patent Application Laid-Open No. 2008-203400

SUMMARY OF INVENTION

Problems to be Solved

A film (synthetic polymer film) including a synthetic polymer such as a cycloolefin-based polymer has properties in which water absorption with respect to a cellulose acrylate film is low and the photoelastic coefficient is small. Accordingly, when a synthetic polymer film is used as a polarizing plate protective film, photoelastic unevenness is suppressed on one hand, but the synthetic polymer film has a problem in that when the polarizing plate is manufactured by a method using a polyvinyl alcohol paste, which has been generally performed in the related art, moisture is insufficiently dried, so that performance of the polarizer deteriorates.

Since the polarizing plate of Patent Document 1 is composed of, as protective films of a polarizer, a cycloolefin-based polymer on one side of the polarizer and a cellulose acylate film on the other side thereof, it is thought that the polarizing plate after manufactured is sufficiently dried, and characteristics of the cycloolefin-based polymer may also be exhibited.

However, when the thickness of the polarizing plate becomes smaller than that used in the related art, in the case where the warpage (curl) of the polarizing plate is observed while the polarizing plate of Patent Document 1 is disposed on a flat plate such that the cellulose acylate film is positioned at the flat plate side thereof (lower side) and the cycloolefin-based polymer film positioned at the upper side thereof, curls may be generated in the manner that four corners of the polarizing plate are lifted up. This curl is also called "a minus curl". When a minus curled polarizing plate is adhered to a liquid crystal cell by using a cycloolefin-based polymer film as an inner-side film, there is a problem in that bubbles enter between the inner side film and the liquid crystal cell, so that performance of a liquid crystal display device deteriorates. Furthermore, in a process of adhering the polarizing plate to a liquid crystal panel, an error (misalignment) occurs, thereby drastically reducing the yield. For that reason, a flat or oppositely curled side (when warpage of the polarizing plate is observed while the polarizing plate is disposed on a flat plate such that a cycloolefin-based polymer film is positioned at the flat plate side thereof and a cellulose acylate film is positioned at the upper side, the case where curls are generated in the manner that four corners of the polarizing plate are lifted up) is preferred (this is called a plus curl). However, even for the plus curl, when the amount of curls is excessively large, it becomes difficult to align the position when the polarizing plate is adhered to a liquid crystal cell, and as a result, this case is also undesirable.

For the curls of the polarizing plate, both curls occurring in the MD direction and in the TD direction are problematic, and accordingly, the occurrence of curls is important. However, in the case of designing a material which constitutes the polarizing plate, a countermeasure against curls occurring in the TD direction is particularly important. The reason is due to the difference in ease for adjusting curls by a process of preparing the polarizing plate. With respect to the curls in the MD direction, curls may be adjusted in a wide range by changing tension in the conveying direction when an inner side film, a polarizer, and an outer side film, which constitute the polarizing plate are conveyed in order to adhere and dry the inner side film, the polarizer and the outer side film. However, the curls in the TD direction may be slightly adjusted by changing the drying conditions, and there is no means for controlling the curls. For that reason, particularly with respect to the TD direction, it is important to design a preferred combination of films.

Here, the inner side film refers to a film disposed at the liquid crystal cell side among two protective films sandwiching a polarizer therebetween. In addition, a film disposed at a side opposite to the liquid crystal cell is called an outer side film.

In the polarizing plate described in Patent Document 1, a protective film having a thickness of 60 μm or more is used, but a thinner protective film has been recently required. Furthermore, when the protective film is made to be thin, there is a problem in that curls are generated more easily.

An object of the present invention is to provide a polarizing plate which is excellent in processing suitability of a polarizing plate, and is also excellent in manufacturing suitability of a liquid crystal display device in spite of a thin film from the viewpoint of curls.

Means for Solving the Problems

As a result of investigation, the present inventors have come to a conclusion that curls in a polarizing plate, which uses a synthetic polymer film having a thickness of 30 μm or less as a first protective film at one side of a polarizer, are greatly changed by the thickness, elastic modulus, and humidity dimensional change rate of a second protective film at the other side of the polarizer. As the tendency, it has been found that when a film having a high elastic modulus and simultaneously a large humidity dimensional change rate is used for a synthetic polymer film having a small elastic modulus and also a small humidity dimensional change rate, the occurrence of curls is reduced. This may not be explained by only disruption of balance of the elastic modulus presumed to be responsible for curls in Patent Document 1. The cause for dependence on the physical property values has not been sufficiently elucidated, but it is thought that the cause for generating curls is because in addition to the balance in dimensional change during the change in elastic modulus or moisture of the front and back protective films, the shrinkage of the polarizer affects curls. It is presumed that as the thickness and elastic modulus of the protective film are increased, the point of warpage shifts to the protective film, and as a result, the amount of curls caused by the shrinkage amount of polarizer is increased. It is thought that a polarizing plate suitable for adhering the panel with less curls may be obtained by imparting shrinkage to the protective film so as to make a balance with shrinkage caused by the polarizer. As a result of investigation based on these thoughts, the present inventors have found that curls may be reduced by setting the relationship of the elastic modulus in the TD direction, thickness and the humidity dimensional change rate in the TD direction to the specific ranges as the second protective film.

That is, the present inventors could find that, in a polarizing plate having, as protective films of a polarizer, a first protective film including a synthetic polymer film at one side of the polarizer and a second protective film at the other side thereof, it has been found that in order to suppress the polarizing plate from being curling (a minus curl) so as to form an arc shape having the first protective film at the inner side thereof in a cross-sectional view of the polarizing plate, it is necessary to suitably design the thickness, the elastic modulus in the TD direction, and the humidity dimensional change rate in the TD direction, of the second protective film.

That is, the problem is solved by the present invention having the following configuration.

[1] A polarizing plate having a first protective film, a polarizer, and a second protective film in this order,
in which the first protective film is a film including a synthetic polymer, and has a thickness of 30 μm or less, an elastic modulus in the TD direction of 2 GPa to 2.5 GPa, and a humidity dimensional change rate in the TD direction, which is represented by the following Equation (1), of 0.1% or less, and
the second protective film has an evaluation value represented by the following Equation (2) of 7.0 to 11.0:

Humidity dimensional change rate (%) in the $TD$ direction=[{(length of a film in the $TD$ direction at 25° C. and a relative humidity of 80%)− (length of a film in the $TD$ direction at 25° C. and a relative humidity of 10%)}/(length of a film in the $TD$ direction at 25° C. and a relative humidity of 60%)]×100    Equation (1):

Evaluation value=elastic modulus (GPa) of the second protective film in the $TD$ direction/humidity dimensional change rate (%) of the second protective film in the $TD$ direction×(thickness (μm) of the second protective film/thickness (μm) of the first protective film)$^2$×(30/thickness (μm) of the polarizer)$^{1/2}$;    Equation (2):

[2] The polarizing plate described in [1], in which the second protective film includes cellulose acylate.

[3] The polarizing plate described in [1] or [2], in which the synthetic polymer included in the first protective film is a cycloolefin-based polymer.

[4] The polarizing plate described in any one of [1] to [3], in which the evaluation value represented by Equation (2) is 9.0 to 10.0.

[5] The polarizing plate described in any one of [1] to [4], in which the polarizing plate has a thickness of 80 μm or less.

[6] A polarizing plate having a first protective film, a polarizer, and a second protective film in this order,
in which the first protective film is a film including a synthetic polymer, and has a thickness of 30 μm or less and an elastic modulus in the TD direction of 2.0 GPa to 2.5 GPa, the polarizer has a thickness of 20 μm, and
the second protective film has an evaluation value A represented by the following Equation (2') of 5.7 to 9.0.

Evaluation value $A$=elastic modulus (GPa) of the second protective film in the $TD$ direction/humidity dimensional change rate (%) of the second protective film in the $TD$ direction×(thickness (μm) of the second protective film/thickness (μm) of the first protective film)$^2$    Equation (2'):

[7] A polarizing plate having a first protective film, a polarizer, and a second protective film in this order,
in which the first protective film is a film including a synthetic polymer, and has a thickness of 30 μm or less and an elastic modulus in the TD direction of 2.0 GPa to 2.5 GPa,
the polarizer has a thickness of 25 μm, and the second protective film has an evaluation value A represented by the following Equation (2') of 6.5 to 10.0.

Evaluation value $A$=elastic modulus (GPa) of the second protective film in the $TD$ direction/humidity dimensional change rate (%) of the second protective film in the $TD$ direction×(thickness (μm) of the second protective film/thickness (μm) of the first protective film)$^2$    Equation (2'):

[8] A polarizing plate having a first protective film, a polarizer, and a second protective film in this order, in which the first protective film is a film including a synthetic polymer, and has a thickness of 30 μm or less and an elastic modulus in the TD direction of 2.0 GPa to 2.5 GPa, the polarizer has a thickness of 30 μm, and the second protective film has an evaluation value A represented by the following Equation (2') of 7.0 to 11.0.

Evaluation value $A$=elastic modulus (GPa) of the second protective film in the $TD$ direction/humidity dimensional change rate (%) of the second protective film in the $TD$ direction×(thickness (μm) of the second protective film/thickness (μm) of the first protective film)$^2$    Equation (2'):

[9] A liquid crystal display device having a liquid crystal cell and at least one polarizing plate described in any one of [1] to [8], in which the first protective film in the polarizing plate is disposed at the liquid crystal cell side.

Effects of Invention

According to the present invention, it is possible to obtain a polarizing plate which is excellent in processing suitability of a polarizing plate, and is also excellent in manufacturing suitability of a liquid crystal display device in spite of a thin film from the viewpoint of curls.

DETAILED DESCRIPTION FOR CARRYING OUT THE INVENTION

Hereinafter, embodiments for carrying out the present invention will be described in detail, but the present invention is not limited thereto. Meanwhile, in the present specification, when numerical values represent physical property values, characteristic values and the like, the description "(numerical value 1) to (numerical value 2)" represents the meaning of "(numerical value 1) or more and (numerical value 2) or less". Further, in the present specification, the description "a (meth) acrylic resin" represents the meaning of "at least one of an acrylic resin and a methacrylic resin. The same also applies to "(meth)acrylate", "(meth)acryloyl" and the like.

A polarizing plate of the present invention is a polarizing plate having a first protective film, a polarizer, and a second protective film in this order, in which the first protective film is a film including a synthetic polymer, and has a thickness of 30 μm or less, an elastic modulus in the TD direction of 2 GPa to 2.5 GPa, and a humidity dimensional change rate in the TD direction, which is represented by the following Equation (1), of 0.1% or less, and the second protective film has an evaluation value represented by the following Equation (2) of 7.0 to 11.0:

Humidity dimensional change rate (%) in the $TD$ direction=[{(length of a film in the $TD$ direction at 25° C. and a relative humidity of 80%)−(length of a film in the $TD$ direction at 25° C. and a relative humidity of 10%)}/(length of a film in the $TD$ direction at 25° C. and a relative humidity of 60%)]×100    Equation (1):

Evaluation value=elastic modulus (GPa) of the second protective film in the $TD$ direction/humidity dimensional change rate (%) of the second protective film in the $TD$ direction×(thickness (μm) of the second protective film/thickness (μm) of the first protective film)$^2$×(30/thickness (μm) of the polarizer)$^{1/2}$;    Equation (2):

The TD direction is a direction that is orthogonal to a conveying direction of a film (MD direction) when the film is manufactured.

Furthermore, in the polarizing plate, a direction that is orthogonal to an absorption axis of the polarizer is usually the TD direction.

Figure 1:
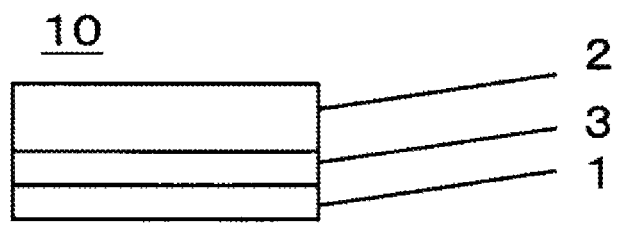
FIG. 1 is a schematic view illustrating an example of a polarizing plate of the present invention.

The polarizing plate of the present invention has a first protective film, a polarizer, and a second protective film in this order. An example of the polarizing plate according to the present invention is illustrated in FIG. 1. The polarizing plate in FIG. 1 has a first protective film 1, a polarizer 3, and a second protective film 2 in this order.

Hereinafter, the polarizer and the protective film, which constitute the polarizing plate of the present invention, will be described.

[Polarizer]

The polarizer in the polarizing plate of the present invention is not particularly limited, and a publicly known polarizer may be used, but a polarizer containing a polyvinyl alcohol-based resin and a dichroic colorant is preferred.

(Polyvinyl Alcohol-Based Resin)

The polyvinyl alcohol-based resin (hereinafter, also referred to as "PVA") is preferably a polymer material obtained by saponifying polyvinyl acetate, and may contain an ingredient that may be copolymerized with vinyl acetate, such as, for example, an unsaturated carboxylic acid, an unsaturated sulfonic acid, olefins and vinyl ethers. In addition, a modified PVA containing an acetoacetyl group, a sulfonic acid group, a carboxyl group, an oxyalkylene group or the like may also be used.

In addition to this, for the polarizer of the present invention, it is possible to use preferably a PVA film containing 1,2-glycol bonds in an amount of 1.5% by mole or less, which is described in Japanese Patent No. 3021494, a PVA film containing optical foreign substances having a size of 5 μm or more by 500 or less per 100 cm2, which is described in Japanese Patent Application Laid-Open No. 2001-316492, a PVA film showing an unevenness in hot-water cutting temperature of 1.5° C. or less in the TD direction of the film, which is described in Japanese Patent Application Laid-Open No. 2002-030163, or a PVA film formed from a solution prepared by mixing 1% by mass to 100% by mass of trivalent to hexavalent polyhydric alcohol such as glycerin or a solution prepared by mixing 15% by mass or more of a plasticizer, which is described in Japanese Patent Application Laid-Open No. H06-289225.

Among them, as the polyvinyl alcohol-based resin used in the polarizer in the present invention, a polyvinyl alcohol-based resin obtained by saponifying polyvinyl acetate is preferred from the viewpoint of the manufacturing cost. Meanwhile, the saponification degree of the polyvinyl acetate is not particularly limited, but is, for example, preferably 90% or more, more preferably 95% or more, and particularly preferably 99% or more.

The weight average molecular weight of the polyvinyl alcohol-based resin which is used for the polarizer in the present invention is not particularly limited, but is preferably 100,000 to 300,000, more preferably 140,000 to 260,000, and particularly preferably 150,000 to 200,000.

(Dichroic Colorant)

It is preferred that the polarizer in the present invention includes a dichroic colorant. Here, the dichroic colorant in the present invention refers to a colorant in which absorbance varies depending on directions, and examples thereof include iodine ion, diazo-based colorants, quinone-based colorants, and other publicly known dichroic dyes. As the dichroic colorant, a high-order iodine ion such as $I_3^-$ or $I_5^-$, or a dichroic dye may be preferably used.

In the present invention, the high-order iodine ion is particularly preferably used. The high-order iodine ion may be produced by immersing PVA in at least one of a solution, which is prepared by dissolving iodine in an aqueous solution of potassium iodide, and an aqueous solution of boric acid, and adsorbing and aligning iodine on the PVA, as described in "Application of Polarizing Plates", edited by Ryo Nagata, CMC Publishing Co., Ltd. or Engineering Materials, Vol 28, No. 7, pp. 39 to 45.

[Method for Manufacturing Polarizer]

The method for manufacturing a polarizer in the present invention is not particularly limited.

For example, as a method for manufacturing a polarizer containing PVA and iodine, a method of fabricating the PVA into a film, and then configuring a polarizer by introducing iodine thereto is preferred. The PVA film may be manufactured with reference to a method described in [0213] to [0237] of Japanese Patent Application Laid-Open No. 2007-86748, Japanese Patent No. 3342516, Japanese Patent Application Laid-Open Nos. H09-328593, 2001-302817 and 2002-144401, and the like.

Among them, as the method for manufacturing a polarizer in the present invention, preferred is a method including the steps of film-making a polyvinyl alcohol-based resin solution containing a polyvinyl alcohol-based resin, stretching the polyvinyl alcohol-based resin film, and dyeing the polyvinyl alcohol-based resin film after being stretched by a dichroic colorant.

Specifically, it is particularly preferred that in the method for manufacturing a polarizer, a process of preparing a PVA-based resin solution, a casting process, a swelling process, a dyeing process, a film hardening process, a stretching process and a drying process are sequentially performed in this order. Further, during or after the above-described processes, an on-line sheet inspection process may be included.

(Preparation of PVA-Based Resin Solution)

In the process of preparing the PVA-based resin solution, it is preferred that a stock solution is prepared by adding a PVA-based resin to water while stirring the PVA-based resin and dissolving the PVA-based resin in water or an organic solvent. The concentration of the polyvinyl alcohol-based resin in the stock solution is preferably from 5% by mass to 20% by mass. Further, a polyvinyl alcohol-based resin wet cake having a water content of 40% may be once prepared by dehydrating the obtained slurry. In addition, thereafter, when an additive is added thereto, for example, preferred is a method of putting a PVA wet cake into a dissolver, adding a plasticizer and water thereto, stirring the solution while blowing steam into the bottom of the dissolver. The internal resin temperature is preferably warmed to 50° C. to 150° C., and the inside of the system may be pressurized.

(Casting)

As the casting process, a method of forming a film by casting the stock solution of the PVA-based resin solution prepared above is generally preferably used. The casting method is not particularly limited, but it is preferred that the heated stock solution of the PVA-based resin solution is supplied to a twin screw extruder and cast from a discharge means (preferably a die, and more preferably a T-type slit die) on a support by means of a gear pump to form a film. Furthermore, the temperature of the resin solution discharged from the die is not particularly limited.

As the support, a cast drum is preferred, and the diameter, width, rotation speed and surface temperature of the drum are not particularly limited. Among them, the diameter (R1) of the cast drum is preferably 2,000 to 5,000 mm, more preferably 2,500 to 4,500 mm, and particularly preferably 3,000 to 3,500 mm.

The width of the cast drum is preferably 2 to 6 m, more preferably 3 to 5 m, and particularly preferably 4 to 5 m.

The rotation speed of the cast drum is preferably 2 to 20 m/min, more preferably 4 to 12 in/min, and particularly preferably 5 to 10 m/min.

The cast drum surface temperature of the cast drum is preferably 40 to 140° C., more preferably 60 to 120° C., and particularly preferably 80 to 100° C.

The resin temperature of the T-type slit die outlet is preferably 40 to 140° C., more preferably 60 to 120° C., and particularly preferably 80 to 100° C.

Thereafter, it is preferred that drying is performed while alternately passing the rear side and surface of the obtained roll through the drying roll. The diameter, width, rotation speed and surface temperature of the drying roll are not particularly limited. Among them, the diameter (R2) of the drying roll is preferably 200 to 450 mm, more preferably 250 to 400 mm, and particularly preferably 300 to 350 mm.

Furthermore, the length of the obtained film is also not particularly limited, and a long-length film of 2,000 m or more, preferably 4,000 m or more may be prepared. The width of the film is also not particularly limited, but is preferably 2 to 6 m, and preferably 3 to 5 m.

(Swelling)

The swelling process is preferably performed with only water, but as described in Japanese Patent Application Laid-Open No. 10-153709, in order to stabilize the optical performance and avoid the generation of wrinkles of a polyvinyl alcohol-based resin film in a manufacturing line, the degree of swelling of the polarizing plate substrate may be controlled by swelling the polyvinyl alcohol-based resin film by a boric acid aqueous solution.

Further, the temperature and time of the swelling process may be arbitrarily set, but is preferably 10° C. to 60° C. and 5 seconds to 2,000 seconds.

Meanwhile, when the swelling process is performed, stretching may be slightly performed, and for example, an aspect in which stretching is performed by 1.05 times to 1.5 times is preferred, and an aspect in which stretching is performed by 1.3 times is more preferred.

(Dyeing)

For the dyeing process, a method described in Japanese Patent Application Laid-Open No. 2002-86554 may be used. In addition, as a dyeing method, it is possible to use any means such as immersion, application and spraying of iodine or a dyeing solution. Furthermore, as described in Japanese Patent Application Laid-Open No. 2002-290025, it is possible to use the concentration of iodine, the temperature of a dye bath, the stretching magnification in the bath and a method of dyeing while stirring a bath solution in the bath.

When a high-order iodine ion is used as the dichroic colorant, it is preferred that the dyeing process uses a solution obtained by dissolving iodine in a potassium iodide aqueous solution in order to obtain a polarizing plate of high contrast. In this case, as the mass ratio of iodine and potassium iodide in the iodine-potassium iodide aqueous solution, an aspect described in Japanese Patent Application Laid-Open No. 2007-086748 may be used.

Furthermore, as described in Japanese Patent No. 3145747, a boron-based compound such as boric acid and borax may be added to a dyeing solution.

(Film Hardening)

In the film hardening process, a crosslinking agent is preferably included by immersing a PVA film in a crosslinking agent solution or applying the solution thereto. Further, as described in Japanese Patent Application Laid-Open No. H11-52130, the film hardening process may be performed by being divided into several times.

As the crosslinking agent, a crosslinking agent described in U.S. Reissue Pat. No. 232897 may be used, and as described in Japanese Patent No. 3357109, a polyvalent aldehyde may be used as the crosslinking agent in order to improve the dimensional stability, but boric acids are most preferably used. When boric acid is used as the crosslinking agent used in the film hardening process, a metal ion may be added to the boric acid-potassium iodide aqueous solution. As the metal ion, zinc chloride is preferred, but as described in Japanese Patent Application Laid-Open No. 2000-35512, a zinc halide such as zinc iodide and a zinc salt such as zinc sulfate and zinc acetate may be used instead of zinc chloride.

In addition, the film may be hardened by preparing a boric acid-potassium iodide aqueous solution to which zinc chloride is added and immersing a PVA film in the solution, and it is possible to use a method described in Japanese Patent Application Laid-Open No. 2007-086748.

(Stretching)

The stretching process may preferably use a longitudinal uniaxial stretching system as described in U.S. Pat. No. 2,454,515, or a tenter system as described in Japanese Patent Application Laid-Open No. 2002-86554. The preferred stretching magnification is 2 times to 12 times, and more preferably 3 times to 10 times. Furthermore, it may also be preferred that the relationship among the stretching magnification, the thickness of the raw fabric and the thickness of the polarizer is regulated at (film thickness of polarizer after adhering the protective film/film thickness of the raw fabric)×(total stretching magnification)>0.17 as described in Japanese Patent Application Laid-Open No. 2002-040256, or that the relationship between the width of the polarizer at the time of leaving a bath finally and the width of the polarizer at the time of adhering the protective film is regulated at 0.80 (width of the polarizer at the time of adhering the protective film/width of the polarizer at the time of leaving a bath finally)≤0.95 as described in Japanese Patent Application Laid-Open No. 2002-040247.

(Drying)

The drying process may use a method publicly known in Japanese Patent Application Laid-Open No. 2002-86554, but a preferred temperature range is 30° C. to 100° C., and a preferred drying time is 30 seconds to 60 minutes. Further, it may also be preferred to perform a thermal treatment in which the discoloration temperature in water is 50° C. or more as described in Japanese Patent No. 3148513, or aging in an atmosphere in which the temperature and humidity are controlled as described in Japanese Patent Application Laid-Open No. H07-325215 or Japanese Patent Application Laid-Open No. H07-325218.

(Application-Type Polarizer)

In addition, a polarizer having a small film thickness may be formed by a manufacturing method using an application method described in Japanese Patent No. 4691205 or Japanese Patent No. 4751481. Meanwhile, the film thickness may be controlled by a publicly known method, and may be controlled, for example, by setting the width of a die slit or stretching conditions in the casting process to appropriate values.

(Film Thickness of Polarizer)

The film thickness of the polarizer is not particularly limited, but is preferably 5 μm to 30 μm, and more preferably 10 μm to 20 μm from the viewpoint of the degree of polarization and warpage. When the film thickness of the polarizer is 30 μm or less, the contractile force of the polarizer is not increased, and accordingly, the warpage of the liquid crystal panel to which the polarizer is adhered is not increased, which is preferred. Meanwhile, when the film thickness of the polarizer is 5 μm or more, it is possible to sufficiently absorb light of polarization at one side thereof, which passes through the polarizer, and accordingly, the degree of polarization is not decreased, which is preferred.

<Protective Film>

Subsequently, a protective film used in the polarizing plate of the present invention (also referred to as "a polarizing plate protective film") will be described.

The polarizing plate of the present invention has a first protective film, a polarizer, and a second protective film in this order.

The first protective film is a film including a synthetic polymer, and has a thickness of 30 μm or less, an elastic modulus in the TD direction of 2 GPa to 2.5 GPa, and a humidity dimensional change rate in the TD direction, which is represented by the following Equation (1), of 0.1% or less.

Humidity dimensional change rate (%) in the *TD* direction=[{(length of a film in the *TD* direction at 25° C. and a relative humidity of 80%)− (length of a film in the *TD* direction at 25° C. and a relative humidity of 10%)}/(length of a film in the *TD* direction at 25° C. and a relative humidity of 60%)]×100     Equation (1):

The second protective film has an evaluation value represented by the following Equation (2) of 7.0 to 11.0.

Evaluation value=elastic modulus (GPa) of the second protective film in the *TD* direction/humidity dimensional change rate (%) of the second protective film in the *TD* direction×(thickness (μm) of the second protective film/thickness (μm) of the first protective film)$^2$×(30/thickness (μm) of the polarizer)$^{1/2}$;     Equation (2):

[First Protective Film]

The first protective film is a film including a synthetic polymer.

As the synthetic polymer, a cycloolefin-based polymer such as norbornene, polyethylene terephthalate, polyethylene naphthalate, polycarbonate, polystyrene, polyarylate, polysulfone, a (meth)acrylic resin and the like are preferred, a (meth)acrylic resin and a cycloolefin-based polymer are more preferred, and from the viewpoint of stability against humidity, a cycloolefin-based polymer is most preferred.

<Cycloolefin-Based Polymer Film>

The cycloolefin-based polymer will be described in detail.

(Cycloolefin-Based Addition Polymer) The cycloolefin-based polymer is preferably a cyclic olefin-based addition polymer including a structural unit (a) represented by the following Formula (1) and a structural unit (b) represented by the following Formula (2) at a suitable ratio.

[Chem. 1]

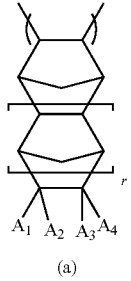

(1)

(a)

$A_1$, $A_2$, $A_3$, and $A_4$ of Formula (1) are each independently a hydrogen atom, an alkyl group having 1 to 10 carbon atoms, an aryl group, a cycloalkyl group having 4 to 15 carbon atoms, and a halogen atom. Furthermore, $A_1$ to $A_4$ also include an alkylene group formed by $A_1$ and $A_2$, $A_1$ and $A_3$, or $A_2$ and $A_4$. r represents an integer of 0 to 2.

The structural unit (a) is formed by addition polymerization of a cyclic olefin compound (hereinafter, referred to as "Specific Monomer (1)") represented by the following Formula (3).

[Chem. 2]

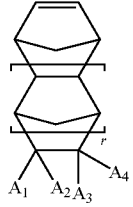

(3)

[$A_1$, $A_2$, $A_3$, and $A_4$ of Formula (3) are each independently a hydrogen atom, an alkyl group having 1 to 10 carbon atoms, an aryl group, a cycloalkyl group having 4 to 15 carbon atoms, and a halogen atom. Further, $A_1$ to $A_4$ also include an alkylene group and an alkylidene group, which are formed by $A_1$ and $A_2$, $A_1$ and $A_3$, or $A_2$ and $A_4$. r represents an integer of 0 to 2.]

Specific examples of "Specific Monomer (1)" represented by Formula (3) include bicyclo[2.2.1]hept-2-ene, 5-methyl-bicyclo[2.2.1]hept-2-ene, 5-ethyl-bicyclo[2.2.1]hept-2-ene, 5-propyl-bicyclo[2.2.1]hept-2-ene, 5-butyl-bicyclo[2.2.1] hept-2-ene, 5-pentyl-bicyclo[2.2.1]hept-2-ene, 5-hexyl-bicyclo[2.2.1]hept-2-ene, 5-heptyl-bicyclo[2.2.1]hept-2-ene, 5-octyl-bicyclo[2.2.1]hept-2-ene, 5-decyl-bicyclo[2.2.1] hept-2-ene, 5-dodecyl-bicyclo[2.2.1]hept-2-ene, 5,6-dimethyl-bicyclo[2.2.1]hept-2-ene, 5-methyl-5-ethyl-bicyclo[2.2.1]hept-2-ene, 5-phenyl-bicyclo[2.2.1]hept-2-ene, 5-cyclohexyl-bicyclo[2.2.1]hept-2-ene, 5-cyclooctyl-bicyclo[2.2.1]hept-2-ene, 5-fluoro-bicyclo[2.2.1]hept-2-ene, 5-chloro-bicyclo[2.2.1]hept-2-ene, tricyclo[4.2.0.1$^{5,8}$]non-2-ene, 1-methyl tricyclo[4.2.0.1$^{5,8}$]non-2-ene, 6-methyl tricyclo[4.2.0.1$^{5,8}$]non-2-ene, tricyclo[5.2.1.0$^{2,6}$]dec-8-ene, 3-methyl tricyclo[5.2.1.0$^{2,6}$]dec-8-ene, 4-methyl tricyclo[5.2.1.0$^{2,6}$]dec-8-ene, tricyclo[6.2.1.0$^{2,7}$]undec-9-ene, 1-methyl tricyclo[6.2.1.0$^{2,7}$]undec-9-ene, 3-methyl tricyclo[6.2.1.0$^{2,7}$]undec-9-ene, 1-ethyl tricyclo[6.2.1.0$^{2,7}$]undec-9-ene, 3-ethyl tricyclo[6.2.1.0$^{2,7}$]undec-9-ene, tricyclo[8.2.1.0$^{2,9}$]tridec-11-ene, 1-methyl tricyclo[8.2.1.0$^{2,9}$]tridec-11-ene, 5-methyl tricyclo[8.2.1.0$^{2,9}$]tridec-11-ene, tetracyclo[4.4.0.1$^{2,5}$.1$^{7,10}$]dodec-3-ene, 8-methyl-tetracyclo[4.4.0.1$^{2,5}$.1$^{7,10}$]dodec-3-ene, 8-ethyl-tetracyclo[4.4.0.1$^{2,5}$.1$^{7,10}$]dodec-3-ene, and the like.

Further, the structural unit (a) may be prepared by addition polymerization of a cyclic diolefin-based compound such as 5-vinyl-bicyclo[2.2.1]hept-2-ene, 5-(1-butenyl)-bicyclo[2.2.1]hept-2-ene, tricyclo[5.2.1.0$^{2,6}$]dec-3,8-diene, 1-methyl tricyclo[5.2.1.0$^{2,6}$]dec-3,8-diene, or 1-ethyl tricyclo[5.2.1.0$^{2,6}$]dec-3,8-diene, and then hydrogenating a cyclic olefinic unsaturated bond present in a side chain thereof.

Meanwhile, in tricyclo[5.2.1.0$^{2,6}$]dec-8-ene, steric isomers of an endo body and an exo body are present, and, in the present invention, a steric isomer which uses the endo body is preferred because the toughness of the finally obtained film is increased, and it is preferred that tricyclo[5.2.1.0$^{2,6}$]dec-8-ene with an endo body content of at least 80% or more is used. In addition, similarly preferred is a method of performing addition polymerization using tricyclo[5.2.1.0$^{2,6}$]dec-3,8-diene of an endo body, and then hydrogenating the cyclic olefinic unsaturated bond remaining in the side chain. Even in this case, the content of the endo body is preferably 80% or more. A cyclic olefin-based polymer obtained using such materials is excellent not only in transparency and heat resistance, but also becomes a polymer having a low water absorption, a low dielectric property and a high toughness. Meanwhile, the "Specific Monomer (1)" may be used either alone or in two or more thereof.

The structural unit (b) represented by the following Formula (2) is formed by addition polymerization of a cyclic olefin (hereinafter, referred to as "Specific Monomer (2)") represented by the following Formula (4).

[Chem. 3]

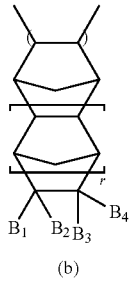

(2)

(b)

[In Formula (2), $B_1$ to $B_4$ each independently represent a hydrogen atom, an alkyl group, a cycloalkyl group, an aryl group, a halogenated alkyl group, a hydrolyzable silyl group or a polar group represented by —(CH$_2$)$_j$X, and at least one of B$_1$ to B$_4$ includes a hydrolyzable silyl group or a polar group represented by —(CH$_2$)$_j$X. Here, X represents —C(O)OR$^1$ or —OC(O)R$^2$, R$^1$ and R$^2$ are a substituent selected from the group consisting of an alkyl group, an alkenyl group, a cycloalkyl group, an aryl group or a halogen-substituted body thereof, having 1 to 10 carbon atoms, and j is an integer of 0 to 3. Furthermore, B$_1$ to B$_4$ also include an alkylene group formed by B$_1$ and B$_3$ or B$_2$ and B$_4$, and an alkylidenyl group formed by B$_1$ and B$_2$ or B$_3$ and B$_4$. r represents an integer of 0 to 2.]

[Chem. 4]

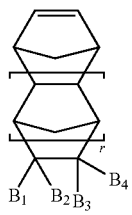

(4)

[In Formula (4), B$_1$ to B$_4$ are the same as those of Formula (2). r represents an integer of 0 to 2.]

5-methoxycarbonyl-bicyclo[2.2.1]hept-2-ene, 5-ethoxycarbonyl-bicyclo[2.2.1]hept-2-ene, 5-butoxycarbonyl-bicyclo[2.2.1]hept-2-ene, 5-methyl-5-methoxycarbonyl-bicyclo[2.2.1]hept-2-ene, 5-methyl-5-ethoxycarbonyl-bicyclo[2.2.1]hept-2-ene, 5-methyl-5-propoxycarbonyl-bicyclo[2.2.1]hept-2-ene, 5-methyl-5-butoxycarbonyl-bicyclo[2.2.1]hept-2-ene, 5-ethyl-5-methoxycarbonyl-bicyclo[2.2.1]hept-2-ene, 5-methyl-5-trifluoromethoxycarbonyl-bicyclo[2.2.1]hept-2-ene, ethyl 5-methyl-bicyclo[2.2.1]hept-2-en-5-ylmethylcarboxylate, acrylic acid-1-methyl-bicyclo[2.2.1]hept-3-ene, methacrylic acid-1-methyl-bicyclo[2.2.1]hept-3-ene, 5,6-di(methoxycarbonyl)-bicyclo[2.2.1]hept-2-ene, 8-methyl-8-methoxycarbonyl-tetracyclo[4.4.0.1$^{2,5}$.1$^{7,10}$]dodeca-3-ene, 8-methyl-8-ethoxycarbonyl-tetracyclo[4.4.0.1$^{2,5}$.1$^{7,10}$]dodec-3-ene, 5-trimethoxysilyl-bicyclo[2.2.1]hept-2-ene, 5-dimethoxychlorosilyl-bicyclo[2.2.1]hept-2-ene, 5-methoxychloromethylsyl-bicyclo[2.2.1]hept-2-ene, 5-dimethoxychlorosilyl-bicyclo[2.2.1]hept-2-ene, 5-methoxyhydridemethylsilyl-bicyclo[2.2.1]hept-2-ene, 5-dimethoxyhydridesilyl-bicyclo[2.2.1]hept-2-ene, 5-methoxydimethylsilyl-bicyclo[2.2.1]hept-2-ene, 5-triethoxysilyl-bicyclo[2.2.1]hept-2-ene, 5-diethoxychlorosilyl-bicyclo[2.2.1]hept-2-ene, 5-ethoxychloromethylsilyl-bicyclo[2.2.1]hept-2-ene, 5-diethoxyhydridesilyl-bicyclo[2.2.1]hept-2-ene, 5-ethoxydimethylsilyl-bicyclo[2.2.1]hept-2-ene, 5-ethoxydiethylsilyl-bicyclo[2.2.1]hept-2-ene, 5-propoxydimethylsilyl-bicyclo[2.2.1]hept-2-ene, 5-tripropoxysilyl-bicyclo[2.2.1]hept-2-ene, 5-triphenoxysilyl-bicyclo[2.2.1]hept-2-ene, 5-trimethoxysilylmethyl-bicyclo[2.2.1]hept-2-ene, 5-dimethylchlorosilyl-bicyclo[2.2.1]hept-2-ene, 5-methyldichlorosilyl-bicyclo[2.2.1]hept-2-ene, 5-trichlorosilyl-bicyclo[2.2.1]hept-2-ene, 5-diethylchlorosilyl-bicyclo[2.2.1]hept-2-ene, 5-ethyldichlorosilyl-bicyclo[2.2.1]hept-2-ene, 5-(2-trimethoxysilyl)ethyl-bicyclo[2.2.1]hept-2-ene, 5-(2-dimethoxyclilorosilyl)ethyl-bicyclo[2.2.1]hept-2-ene, 5-(1-trimethoxysilyl)ethyl-bicyclo[2.2.1]hept-2-ene, 5-(2-trimethoxysilyl)propyl-bicyclo[2.2.1]hept-2-ene, 5-(1-trimethoxysilyl)propyl-bicyclo[2.2.1]hept-2-ene, 5-triethoxysilylethyl-bicyclo[2.2.1]hept-2-ene, 5-dimethoxymethylsilylmethyl-bicyclo[2.2.1]hept-2-ene, 5-trimethoxypropylsilyl-bicyclo[2.2.1]hept-2-ene, 5-methyl-5-(3-triethoxysilyl)propoxycarbonyl-bicyclo[2.2.1]hept-2-ene, 8-triethoxysilyl-tetracyclo[4.4.0.1$^{2,5}$.1$^{7,10}$]dodec-3-ene, 8-methyldimethoxysilyl-tetracyclo[4.4.0.1$^{2,5}$.1$^{7,10}$]dodec-3-ene, 5-[1'-methyl-2',5'-dioxa-1'-silacyclopentyl]-bicyclo[2.2.1]hept-2-ene, 5-[1'-methyl-3',3',4',4'-tetraphenyl-2',5'-dioxa-1'-silacyclopentyl]-bicyclo[2.2.1]hept-2-ene, 5-[1'-methyl-3',3',4',4'-tetramethyl-2',5'-dioxa-1'-silacyclopentyl]-bicyclo[2.2.1]hept-2-ene, 5-[1'-phenyl-2',5'-dioxa-1'-silacyclopentyl]-bicyclo[2.2.1]hept-2-ene, 5-[1'-ethyl-2',5'-dioxa-1'-silacyclopentyl]-bicyclo[2.2.1]hept-2-ene, 5-[1',3'-dimethyl-2',5'-dioxa-1'-silacyclopentyl]-bicyclo[2.2.1]hept-2-ene, 5-[1'-methyl-3',4'-dimethyl-2',5'-dioxa-1'-silacyclopentyl]-bicyclo[2.2.1]hept-2-ene, 5-[1'-methyl-2',6'-dioxa-1'-silacyclohexyl]-bicyclo[2.2.1]hept-2-ene, 5-[1'-ethyl-2',6'-dioxa-1'-silacyclohexyl]-bicyclo[2.2.1]hept-2-ene, 5-[1',3'-dimethyl-2',6'-dioxa-1'-silacyclohexyl]-bicyclo[2.2.1]hept-2-ene, 5-[1'-methyl-4',4'-dimethyl-2',6'-dioxa-1'-silacyclohexyl]-bicyclo[2.2.1]hept-2-ene, 5-[1'-methyl-4',4'-dimethyl-2',6'-dioxa-1'-silacyclohexyl]methyl-bicyclo[2.2.1]hept-2-ene, 5-[1'-methyl-4',4'-dimethyl-2',6'-dioxa-1'-silacyclohexyl]ethyl-bicyclo[2.2.1]hept-2-ene, 5-[1'-phenyl-4',4'-dimethyl-2',6'-dioxa-1'-silacyclohexyl]-bicyclo[2.2.1]hept-2-ene, 5-[1'-methyl-4'-phenyl-2',6'-dioxa-1'-silacyclohexyl]-bicyclo[2.2.1]hept-2-ene, 5-[1'-methyl-4'-spiro-cyclohexyl-2',6'-dioxa-1'-silacyclohexyl]-bicyclo[2.2.1]hept-2-ene, 5-[1'-methyl-4'-ethyl-4'-butyl-2',6'-dioxa-1'-silacyclohexyl]-bicyclo[2.2.1]hept-2-ene, 5-[1'-methyl-3',3'-dimethyl-5'-methylene-2',6'-dioxa-1'-silacyclohexyl]-bicyclo[2.2.1]hept-2-ene, 5-[1'-phenyl-2',6'-dioxa-1'-silacyclohexyl]-bicyclo[2.2.1]hept-2-ene, 5-[1'-methyl-3'-phenyl-2',6'-dioxa-1'-silacyclohexyl]-bicyclo[2.2.1]hept-2-ene, 5-[1'-methyl-4',4'-dimethyl-2',6'-dioxa-1'-silacyclohexyl]-7-oxa-bicyclo[2.2.1]hept-2-ene, 5-[1'-methyl-2',6'-dioxa-1'-silacyclohexyl]-7-oxa-bicyclo[2.2.1]hept-2-ene, 5-[1'-methyl-2',7'-dioxa-1'-silacycloheptyl]-bicyclo[2.2.1]hept-2-ene, 8-[1'-methyl-4',4'-dimethyl-2',6'-dioxa-1'-silacyclohexyl]-tetracyclo[4.4.0.1$^{2,5}$.1$^{7,10}$]dodec-3-ene, 8-[1'-methyl-2',6'-dioxa-1'-silacyclohexyl]-tetracyclo[4.4.0.1$^{2,5}$.1$^{7,10}$]dodec-3-ene, 8-methyl-8-methoxycarbonyl-9-methoxycarbonyl tetracyclo[4.4.0.1$^{2,5}$.1$^{7,10}$]dodec-3-ene and the like.

The ratio of the structural unit (b) included in the cyclic olefin-based polymer that may be used in the present invention is 30 to 99 mol %, preferably 40 to 95 mol %, and more preferably 50 to 90 mol %, of the entire structural units. When the ratio of the structural unit (b) of the cyclic olefin-based polymer is in the aforementioned range, the contact and adhesion properties with polyvinyl alcohol used in the polarizer is good, the hygroscopicity does not increase, and the dimensional stability is excellent. Meanwhile, the arrangement of the structural unit (b) is not limited, such as a random form and a block form in the cyclic olefin-based polymer, but is preferably the random form. Furthermore, a cyclic olefin-based addition polymer, which includes a structural unit (b) having, as a side chain substituent, a reactive substituent such as a hydrolyzable silyl group, an ester group, an acryloyl group, or a methacryloyl group enables a film of the cyclic olefin-based polymer of the present invention to be a crosslinked body by using a crosslinking agent, which will be described below.

The cyclic olefin-based polymer that may be used in the present invention may further introduce a structural unit (c) obtained by addition polymerization of a "specific α-olefin compound".

Specific examples of the "specific α-olefin compound" include ethylene, propylene, 1-butene, 1-hexene, 1-octene, trimethylsilylethylene, triethylsilylethylene, styrene, and the like, but ethylene is preferred.

By introducing the repeating unit (c) derived from the "specific α-olefin compound" into the polymer, the glass transition temperature of the cyclic olefin-based polymer that may be used in the present invention may be controlled. The ratio of the repeating unit (c) included in the cyclic olefin-based polymer that may be used in the present invention is 0 to 30 mol %, and preferably 0 to 20 mol %. When the ratio of the repeating unit (c) is in the aforementioned range, the glass transition temperature of the cyclic olefin-based polymer that may be used in the present invention does not become 170° C. or less, and the heat resistance does not deteriorate, which is preferred.

The molecular weight of the cyclic olefin-based polymer that may be used in the present invention may be expressed in terms of polystyrene, and accordingly, the number average molecular weight is preferably 10,000 to 300,000, the weight average molecular weight is preferably 20,000 to 700,000, the number average molecular weight is more preferably 20,000 to 200,000, the weight average molecular weight is more preferably 50,000 to 500,000, the number average molecular weight is even more preferably 50,000 to 150,000, and the weight average molecular weight is even more preferably 100,000 to 300,000. When the number average molecular weight and the weight average molecular weight are in the aforementioned ranges, the toughness is excellent when a film is made, so that the film is difficult to break, and the solution viscosity does not increase, so that the workability of film formation by the solution cast method is good, or the surface of the film obtained and the like are good.

Further, the glass transition temperature of the cyclic olefin-based polymer that may be used in the present invention is preferably 180 to 450° C., and more preferably 200 to 400° C. in an uncrosslinked state. When the glass transition temperature of the polymer is in the aforementioned range, the heat resistance is sufficient, and the toughness as the film is also excellent, so that the film is difficult to break.

The cyclic olefin-based polymer that may be used in the present invention is prepared by usually using the "Specific Monomer (1)", using the "Specific Monomer (2)" if necessary in order to form crosslinking or impart adhesion and contact, and further using the "specific α-olefin compound" if necessary in order to control the glass transition temperature. Hereinafter, the production method will be described.

Examples of a polymerization catalyst include [1] a single complex catalyst such as Pd and Ni, [2] a multicomponent-based catalyst by a combination of a palladium complex having a σ bond or σ and π bonds and an organoaluminum or a superacid salt, and [3] a multicomponent-based catalyst including 1) a transition metal compound selected from a nickel compound, a cobalt compound, a titanium compound, or a zirconium compound, 2) a compound selected from a superacid, a Lewis acid, and an ionic boron compound, and 3) an organoaluminum compound, but the present invention is not limited thereto. These polymerization catalysts are described in [0132] to [0139] of Japanese Unexamined Patent Application Publication No. 2008-529038, and thus may be referred to even in the present invention.

It is preferred that these components of the single complex catalyst or the multicomponent-based catalyst are used in an amount used in the following range. It is preferred that the transition metal compound such as a nickel compound, a palladium compound, a cobalt compound, a titanium compound and a zirconium compound is present in an amount of 0.02 to 100 milimole atoms with respect to 1 mole of the monomer, the organoaluminum compound is present in an amount of 1 to 5,000 mole with respect to 1 mole atoms of the transition metal compound, and the superacid, the Lewis acid, and the ionic boron compound are present in an amount of 0 to 100 moles with respect to 1 mole atoms of the transition metal compound.

The cyclic olefin-based polymer that may be used in the present invention is obtained by carry out polymerization using a single complex catalyst or a multicomponent-based catalyst including the aforementioned components in one or two or more solvents selected from an alicyclic hydrocarbon solvent such as cyclohexane, cyclopentane, or methylcyclopentane, an aliphatic hydrocarbon solvent such as hexane, heptane, or octane, an aromatic hydrocarbon solvent such as toluene, benzene, xylene, or mesitylene, and a halogenated hydrocarbon solvent such as dichloromethane, 1,2-dichloroethane, 1,1-dichloroethane, tetrachloroethane, chlorobenzene, or dichlorobenzene in a temperature range of –20° C. to 120° C.

(Cycloolefin-Based Ring-Opened Polymer)

As the cycloolefin-based polymer which may be used in the present invention, a ring-opened polymer having a repeating unit of the following Formulae (5) and (6) may also preferably used.

[Chem. 5]

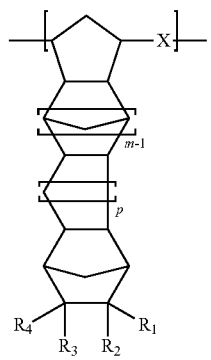

(5)

[In Formula (5), m represents an integer of 1 or more, p represents an integer of 0 or 1 or more, X represents a vinylene group (—CH=CH—) or an ethylene group (—CH$_2$CH$_2$—), R$_1$ to R$_4$ each independently represent a hydrogen atom; a halogen atom; a substituted or unsubstituted hydrocarbon group having 1 to 30 carbon atoms, which may have a linking group including an oxygen atom, a nitrogen atom, a sulfur atom or a silicon atom; or a polar group.

Furthermore, R$_1$ and R$_2$, R$_3$ and R$_4$ or R$_2$ and R$_3$ may combine with each other to form a carbon ring or heterocyclic ring having a monocyclic structure or a polycyclic structure obtained by condensation with other rings, and the carbon ring or heterocyclic ring thus formed may be an aromatic or nonaromatic ring.]

[Chem. 6]

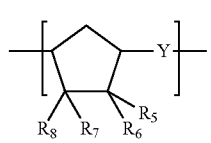

(6)

[In Formula (6), Y represents a vinylene group (—CH=CH—) or an ethylene group (—CH$_2$CH$_2$—), R$_5$ to R$_8$ each independently represent a hydrogen atom; a halogen atom; a substituted or unsubstituted hydrocarbon group having 1 to 30 carbon atoms, which may have a linking group including an oxygen atom, a nitrogen atom, a sulfur atom or a silicon atom; or polar group. Furthermore, $R_5$ and $R_6$, $R_7$ and $R_8$ or $R_6$ and $R_7$ may combine with each other to form a carbon ring or heterocyclic ring having a monocyclic structure or a polycyclic structure obtained by condensation with other rings (provided that a structure represented by Formula (5) is excluded), and the carbon ring or heterocyclic ring thus formed may be an aromatic or nonaromatic ring.]

The aforementioned polymers of Formulae (5) and (6) are synthesized as a (co)polymer (hereinafter, also referred to as a "specific polymer") of monomers shown in the following (a) to (d). (a) Ring-opened polymer of a compound represented by the following Formula (7) (hereinafter, also referred to as "specific monomer d"). (b) Ring-opened polymer of the specific monomer d with a compound copolymerizable with the specific monomer d (hereinafter, also referred to as a "copolymerizable monomer"). (c) Hydrogenation product of the aforementioned ring-opened polymer (a) or ring-opened polymer (b). (d) Compound obtained by cyclization of the aforementioned ring-opened polymer (a) or ring-opened polymer (b) by Friedel-Crafts reaction, or the hydrogenation product thereof.

[Chem. 7]

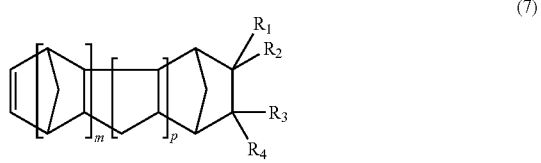

(7)

[In Formula (7), m represents an integer of 1 or more, p represents an integer of 0 or 1 or more, and $R_1$ to $R_4$ each independently represent a hydrogen atom; a halogen atom; a substituted or unsubstituted hydrocarbon group having 1 to 30 carbon atoms, which may have a linking group including an oxygen atom, a nitrogen atom, a sulfur atom or a silicon atom; or a polar group. Furthermore, $R_1$ and $R_2$, $R_3$ and $R_4$ or $R_2$ and $R_3$ may combine with each other to form a carbon ring or heterocyclic ring having a monocyclic structure or a polycyclic structure obtained by condensation with other rings, and the carbon ring or heterocyclic ring thus formed may be an aromatic or nonaromatic ring.]

It is preferred that the specific polymer is obtained by using a compound represented by the following Formula (8) (hereinafter, also referred to as "specific monomer e") as a copolymerizable monomer and copolymerizing specific monomer d and specific monomer e. According to the specific polymer with this configuration, a specific phase difference film which is finally obtained has more improved mechanical properties such as toughness, and further, by the stretching processing, it becomes easy to obtain a desired phase difference required for the specific phase difference film.

[Chem. 8]

(8)

[In Formula (8), $R_5$ to $R_8$ each independently represent a hydrogen atom; a halogen atom; a substituted or unsubstituted hydrocarbon group having 1 to 30 carbon atoms, which may have a linking group including an oxygen atom, a nitrogen atom, a sulfur atom or a silicon atom; or polar group. Furthermore, $R_5$ and $R_6$, $R_7$ and $R_8$ or $R_6$ and $R_7$ may combine with each other to form a carbon ring or heterocyclic ring having a monocyclic structure or a polycyclic structure obtained by condensation with other rings (provided that a structure represented by Formula (5) is excluded), and the carbon ring or heterocyclic ring thus formed may be an aromatic or nonaromatic ring.]

Further, the specific polymer is a ring-opened polymer of specific monomer d and specific monomer e, and preferably has a structural unit derived from specific monomer d represented by Formula (5) (hereinafter, also referred to as "structural unit d") and a structural unit derived from specific monomer e represented by Formula (6) (hereinafter, also referred to as "structural unit e"). The specific polymer having such a configuration is preferred in that the heat resistance and the heat-workability by stretching and the like may be balanced well.

Examples of the halogen atom in Formulae (5) to (8) include a fluorine atom, a chlorine atom, and a bromine atom.

Examples of the hydrocarbon group having 1 to 30 carbon atoms include an alkyl group such as a methyl group, an ethyl group and a propyl group; a cycloalkyl group such as a cyclopentyl group and a cyclohexyl group; an alkenyl group such as a vinyl group, an allyl group and a propenyl group, and the like.

In addition, the substituted or unsubstituted hydrocarbon group in Formulae (5) to (8) may be bonded to the cyclic structure directly or via a linking group (linkage).

Examples of the linking group include a divalent hydrocarbon group having 1 to 10 carbon atoms [for example, an alkylene group represented by —$(CH_2)_q$— (in the formula, q is an integer of 1 to 10)]; and a linking group including an oxygen atom, a nitrogen atom, a sulfur atom or a silicon atom [for example, a carbonyl group (—CO—), an oxycarbonyl group (—O(CO)—), a sulfone group (—$SO_2$—), an ether bond (—O—), a thioether bond (—S—), an imino group (—NH—), an amide bond (—NHCO—, —CONH—), a siloxane bond (—$OSi(R_9)_2$— (in the formula, $R_9$ is an alkyl group such as methyl and ethyl))], or those in which two or more of these compounds are bonded, and the like.

Examples of the polar group include a hydroxyl group, an alkoxy group having 1 to 10 carbon atoms, an alkoxycarbonyl group, an aryloxy carbonyl group, a cyano group, an amide group, an imide ring-containing group, a triorganosiloxy group, a triorganosilyl group, an amino group, an acyl group, an alkoxysilyl group, a sulfonyl-containing group, a carboxyl group, and the like. More specifically, examples of the alkoxy group include a methoxy group, an ethoxy group, and the like; examples of the alkoxycarbonyl group include a methoxycarbonyl group, an ethoxycarbonyl group, and the like; examples of the aryloxycarbonyl group include a phenoxycarbonyl group, a naphthyloxycarbonyl group, a fluorenyl oxycarbonyl group, a biphenylyloxycarbonyl group, and the like; examples of the triorganosiloxy group include a trimethylsiloxy group, a triethylsiloxy group, and the like; examples of the triorganosilyl group include a trimethylsilyl group, a triethylsilyl group, and the like; examples of the amino group include a primary amino group; and examples of the alkoxysilyl group include a trimethoxysilyl group, a triethoxysilyl group, and the like.

Specific examples of the specific monomer d include tetracyclo[$4.4.0.1^{2,5}.1^{7,10}$]-3-dodecene, pentacyclo[$9.2.1.1^{3,9}.0^{2,10}.0^{4,8}$]-12-pentadecene, pentacyclo[$9.2.1.1^{5,8}.0^{2,10}.0^{4,9}$]-12 pentadecene, 8-methoxycarbonyltetracyclo[$4.4.0.1^{2,5}.1^{7,10}$]-3-dodecene, 8-ethoxycarbonyltetracyclo

[4.4.0.1$^{2,5}$.1$^{7,10}$]-3-dodecene, 8-n-propoxycarbonyltetracyclo[4.4.0.1$^{2,5}$.1$^{7,10}$]-3-dodecene, 8-isopropoxycarbonyltetracyclo[4.4.0.1$^{2,5}$.1$^{7,10}$]-3-dodecene, 8-n-butoxycarbonyltetracyclo[4.4.0.1$^{2,5}$.1$^{7,10}$]-3-dodecene, 8-phenoxycarbonyltetracyclo[4.4.0.1$^{2,5}$.1$^{7,10}$]-3-dodecene, 8-methyl-8-methoxycarbonyltetracyclo[4.4.0.1$^{2,5}$.1$^{7,10}$]-3-dodecene, 8-methyl-8-ethoxycarbonyltetracyclo[4.4.0.1$^{2,5}$.1$^{7,10}$]-3-dodecene, 8-methyl-8-n-propoxycarbonyltetracyclo[4.4.0.1$^{2,5}$.1$^{7,10}$]-3-dodecene, 8-methyl-8-isopropoxycarbonyltetracyclo[4.4.0.1$^{2,5}$.1$^{7,10}$]-3-dodecene, 8-fluoro-8-pentafluoroethyl-9,9-bis(trifluoromethyl)tetracyclo[4.4.0.1$^{2,5}$.1$^{7,10}$]-3-dodecene, 8,9-difluoro-8-heptafluoro-iso-propyl-9-trifluoromethyltetracyclo[4.4.0.1$^{2,5}$.1$^{7,10}$]-3-dodecene, 8-chloro-8,9,9-trifluorotetracyclo[4.4.0.1$^{2,5}$.1$^{7,10}$]-3-dodecene, 8,9-dichloro-8,9-bis(trifluoromethyl)tetracyclo[4.4.0.1$^{2,5}$.1$^{7,10}$]-3-dodecene, 8-(2,2,2-trifluoroethoxycarbonyl)tetracyclo[4.4.0.1$^{2,5}$.1$^{7,10}$]-3-dodecene, 8-methyl-8-(2,2,2-trifluoroethoxycarbonyl)tetracyclo[4.4.0.1$^{2,5}$.1$^{7,10}$]-3-dodecene, 8-(4-biphenylcarbonyloxymethyl)tetracyclo[4.4.0.1$^{2,5}$.1$^{7,10}$]-3-dodecene, 8-(4-biphenylcarbonyloxyethyl)tetracyclo[4.4.0.1$^{2,5}$.1$^{7,10}$]-3-dodecene, 8-methyl-8-(4-biphenylcarbonyloxymethyl)tetracyclo[4.4.0.1$^{2,5}$.1$^{7,10}$]-3-dodecene, 8-(2-biphenylcarbonyloxymethyl)tetracyclo[4.4.0.1$^{2,5}$.1$^{7,10}$]-3-dodecene, 8-methyl-8-(2-biphenylcarbonyloxymethyl)tetracyclo[4.4.0.1$^{2,5}$.1$^{7,10}$]-3-dodecene, 8-(3-biphenylcarbonyloxymethyl)tetracyclo[4.4.0.1$^{2,5}$.1$^{7,10}$]-3-dodecene, 8-methyl-8-(3-biphenylcarbonyloxymethyl)tetracyclo[4.4.0.1$^{2,5}$.1$^{7,10}$]-3-dodecene, 8-(1-naphthylcarbonyloxymethyl)tetracyclo[4.4.0.1$^{2,5}$.1$^{7,10}$]-3-dodecene, 8-methyl-8-(1-naphthylcarbonyloxymethyl)tetracyclo[4.4.0.1$^{2,5}$.1$^{7,10}$]-3-dodecene, 8-(2-naphthylcarbonyloxymethyl)tetracyclo[4.4.0.1$^{2,5}$.1$^{7,10}$]-3-dodecene, 8-methyl-8-(2-naphthylcarbonyloxymethyl)tetracyclo[4.4.0.1$^{2,5}$.1$^{7,10}$]-3-dodecene, 8-(9-anthracenylcarbonyloxymethyl)tetracyclo[4.4.0.1$^{2,5}$.1$^{7,10}$]-3-dodecene, 8-methyl-8-(9-anthracenylcarbonyloxymethyl)tetracyclo[4.4.0.1$^{2,5}$.1$^{7,10}$]-3-dodecene, a Diels-Alder addition product of 1,2-(2H,3H-[1,3]epicyclopenta)-1,2-dihydroacenaphthylene and cyclopentadiene, and the like, but specific monomer d is not limited to these compounds.

Among them, a compound having at least one polar group in the molecule is preferred, and particularly, in Formula (7), R$_1$ and R$_3$ are each a hydrogen atom or a hydrocarbon group having 1 to 10 carbon atoms, and R$_2$ and R$_4$ are each a hydrogen atom or one corresponding to a monovalent organic group, and it is preferred that at least one of R$_2$ and R$_4$ is a polar group other than a hydrogen atom and a hydrocarbon group because the adhesion and contact properties with another material are enhanced.

Here, the content of the polar group in the specific polymer obtained is determined according to a desired function and the like required for a specific phase difference film finally obtained, and is not particularly limited, but in all of the structural units derived from the specific monomers d, the structural unit derived from specific monomer d having a polar group is usually 1 mol % or more, preferably 5 mol % or more, and even more preferably 10 mol % or more, and all of the structural units derived from specific monomers d may have a polar group.

It is preferred that specific monomer d is one represented by Formula (7) in which at least one of R$_2$ and R$_4$ has a polar group represented by Formula (9), because it is easy to control the glass transition temperature and the water absorption of the specific polymer obtained.

[Chem. 9]

$(CH_2)_n COOR_{10}$ (9)

[In Formula (9), n is an integer of 0 to 5 and R$_{10}$ is a monovalent organic group.]

Specific examples of the monovalent organic group represented by R$_{10}$ in Formula (9) include an alkyl group such as a methyl group, an ethyl group, or a propyl group; an aryl group such as a phenyl group, a naphthyl group, an anthracenyl group, or a biphenylyl group; and a monovalent group having an aromatic ring such as a diphenyl sulfone or fluorenes such as tetrahydrofluorene, or having a heterocyclic ring such as a furan ring or an imide ring, and the like.

Furthermore, in Formula (9), n is an integer of 0 to 5, preferably 0 to 2, and more preferably 0. The smaller the value of n is, the higher the glass transition temperature of the specific polymer obtained is, which is preferred, and particularly, specific monomer d having a value of n of 0 is preferred from the viewpoint of ease of synthesis.

Further, specific monomer d is preferably one represented by Formula (7) in which an alkyl group is further bonded to the carbon atom to which the polar group represented by Formula (9) is bonded, and accordingly, a balance may be achieved between the heat resistance and the water absorption of the specific polymer obtained. Here, the number of carbon atoms of the alkyl group is preferably 1 to 5, more preferably 1 to 2, and particularly preferably 1.

In addition, it is preferred that specific monomer d is one represented by Formula (7) in which m is 1 and p is 0, because a specific polymer having a high glass transition temperature may be obtained.

Specific examples of specific monomer e include bicyclo[2.2.1]hept-2-ene, tricyclo[5.2.1.02,6]dec-8-ene, tricyclo[6.2.1.02,7]undec-9-ene, 5-methylbicyclo[2.2.1]hept-2-ene, 5-ethylbicyclo[2.2.1]hept-2-ene, 5-methoxycarbonylbicyclo[2.2.1]hept-2-ene, 5-methyl-5-methoxycarbonylbicyclo[2.2.1]hept-2-ene, 5-phenoxycarbonylbicyclo[2.2.1]hept-2-ene, 5-methyl-5-phenoxycarbonylbicyclo[2.2.1]hept-2-ene, 5-cyanobicyclo[2.2.1]hept-2-ene, 5-ethylidenebicyclo[2.2.1]hept-2-ene, 5-phenylbicyclo[2.2.1]hept-2-ene, 5-(2-naphthyl)bicyclo[2.2.1]hept-2-ene (a body and β body), 5-fluorobicyclo[2.2.1]hept-2-ene, 5-fluoromethylbicyclo[2.2.1]hept-2-ene, 5-trifluoromethylbicyclo[2.2.1]hept-2-ene, 5-pentafluoroethylbicyclo[2.2.1]hept-2-ene, 5,5-difluorobicyclo[2.2.1]hept-2-ene, 5,6-difluorobicyclo[2.2.1]hept-2-ene, 5,5-bis(trifluoromethyl)bicyclo[2.2.1]hept-2-ene, 5,6-bis(trifluoromethyl)bicyclo[2.2.1]hept-2-ene, 5-methyl-5-trifluoromethylbicyclo[2.2.1]hept-2-ene, 5,5,6-trifluorobicyclo[2.2.1]hept-2-ene, 5,5,6-tris(fluoromethyl)bicyclo[2.2.1]hept-2-ene, 5,5,6,6-tetrafluorobicyclo[2.2.1]hept-2-ene, 5,5,6,6-tetrakis(trifluoromethyl)bicyclo[2.2.1]hept-2-ene, 5,5-difluoro-6,6-bis(trifluoromethyl)bicyclo[2.2.1]hept-2-ene, 5,6-difluoro-5,6-bis(trifluoromethyl)bicyclo[2.2.1]hept-2-ene, 5,5,6-trifluoro-5-trifluoromethylbicyclo[2.2.1]hept-2-ene, 5-fluoro-5-pentafluoroethyl-6,6-bis(trifluoromethyl)bicyclo[2.2.1]hept-2-ene, 5,6-difluoro-5-heptafluoro-iso-propyl-6-trifluoromethylbicyclo[2.2.1]hept-2-ene, 5-chloro-5,6,6-trifluorobicyclo[2.2.1]hept-2-ene, 5,6-dichloro-5,6-bis(trifluoromethyl)bicyclo[2.2.1]hept-2-ene, 5,5,6-trifluoro-6-trifluoromethoxybicyclo[2.2.1]hept-2-ene, 5,5,6-trifluoro-6-heptafluoropropoxybicyclo[2.2.1]hept-2-ene, 5-(4-phenylphenyl)bicyclo[2.2.1]hept-2-ene, 4-(bicyclo[2.2.1]hept-5-en-2-yl)phenylsulfonylbenzene, 5-(4-biphenylcarbonyloxymethyl)bicyclo[2.2.1]hept-2-ene, 5-(4-biphenylcarbonyloxyethyl)bicyclo[2.2.1]hept-2-ene, 5-(4-biphenylcarbonyloxypropyl)bicyclo[2.2.1]hept-2-ene, 5-methyl-5-(4-biphenylcarbonyloxymethyl)bicyclo[2.2.1]hept-2-ene, 5-(2-biphenylcarbonyloxymethyl)bicyclo[2.2.1]hept-2-ene, 5-(2-biphenylcarbonyloxyethyl)bicyclo[2.2.1]

hept-2-ene, 5-methyl-5-(2-biphenylcarbonyloxymethyl) bicyclo[2.2.1]hept-2-ene, 5-(3-biphenylcarbonyloxymethyl) bicyclo[2.2.1]hept-2-ene, 5-(3-biphenylcarbonyloxyethyl) bicyclo[2.2.1]hept-2-ene, 5-(1-naphthylcarbonyloxymethyl) bicyclo[2.2.1]hept-2-ene, 5-(1-naphthylcarbonyloxyethyl) bicyclo[2.2.1]hept-2-ene, 5-methyl-5-(1-naphthylcarbonyloxymethyl)bicyclo [2.2.1]hept-2-ene, 5-(2-naphthylcarbonyloxymethyl)bicyclo [2.2.1]hept-2-ene, 5-(2-naphthylcarbonyloxyethyl)bicyclo [2.2.1]hept-2-ene, 5-methyl-5-(2-naphthylcarbonyloxymethyl)methylbicyclo[2.2.1]hept-2-ene, 5-(9-anthracenylcarbonyloxymethyl)bicyclo[2.2.1] hept-2-ene, 5-(9-anthracenylcarbonyloxyethyl)bicyclo [2.2.1]hept-2-ene, 5-methyl-5-(9-anthracenylcarbonyloxymethyl)bicyclo[2.2.1]hept-2-ene, a Diels-Alder addition product of acenaphthylene and cyclopentadiene, and the like, but specific monomer e is not limited to these compounds. Furthermore, these compounds may be used either alone or in combination of two or more thereof as specific monomer e.

The specific polymer obtained by copolymerizing specific monomer d and specific monomer e may be a copolymer obtained by copolymerization with another copolymerizable monomer in addition to specific monomer d and specific monomer e.

Examples of another copolymerizable monomer include cycloolefins such as cyclobutene, cyclopentene, cycloheptene, cyclooctene, and dicyclopentadiene. The number of carbon atoms of the cycloolefin is preferably 4 to 20, and more preferably 5 to 12. Furthermore, specific monomer d, and specific monomer e, if necessary, may be polymerized in the presence of an unsaturated hydrocarbon-based polymer, and the like, which have an olefinically unsaturated bond in the main chain, such as polybutadiene, polyisoprene, a styrene-butadiene copolymer, an ethylene-nonconjugated diene copolymer, or polynorbornene, and the specific polymer thus obtained is useful as a raw material for a resin having high impact resistance.

The inherent viscosity ($\eta_{inh}$) of the specific polymer measured in chloroform at 30° C. is preferably 0.2 to 5 dl/g. The inherent viscosity is more preferably 0.3 to 4 dl/g, and particularly preferably 0.5 to 3 dl/g. When the inherent viscosity is in the aforementioned range, the processability is good, and the film strength is also sufficient because the solution viscosity is not increased.

With regard to the molecular weight of the specific polymer, the number average molecular weight (Mn) in terms of polystyrene measured by gel permeation chromatography (GPC) is usually in a range of 8,000 to 1,000,000, preferably 10,000 to 500,000, more preferably 20,000 to 100,000, and particularly preferably 30,000 to 100,000, and the weight average molecular weight (Mw) is usually in a range of 20,000 to 3,000,000, preferably 30,000 to 1,000,000, more preferably 40,000 to 500,000, and particularly preferably 40,000 to 300,000.

Further, as the molecular weight distribution of the specific polymer, the aforementioned Mw/Mn is usually 1.5 to 10, preferably 2 to 8, more preferably 2.5 to 5, and particularly preferably 2.5 to 4.5.

The glass transition temperature (Tg) of the specific polymer may be changed appropriately by, for example, adjusting the types of structural unit d and structural unit e of the specific polymer or the ratio of the structural unit d and the structural unit e, or by adding an additive, and the like, but the glass transition temperature is usually 100 to 250° C., preferably 110 to 200° C., and more preferably 120 to 180° C. When the Tg is 100° C. or more, the thermal deformation temperature does not decrease, so that no problem may occur with the heat resistance, and the optical properties of the finally obtained film are little affected by temperature, which is preferred. In addition, when the Tg is 250° C. or less, in the case where stretching process is performed by heating in the vicinity of the Tg during stretching processing, and the like, a thermoplastic cycloolefin-based resin, preferably a norbornene-based resin, are less likely to be thermally degraded, which is preferred.

With regard to the specific polymer having structural unit d and structural unit e, the ratio (d/e) of structural unit d to structural unit e is preferably d/e=95/5 to 5/95, and more preferably 95/5 to 60/40, as a molar ratio. When the ratio of structural unit d is in the aforementioned range, the effect of improving toughness and the desired optical properties may be sufficiently expected, and the glass transition temperature does not decrease so that no problem occurs with the heat resistance, which is preferred.

Furthermore, in the specific polymer having structural unit d and structural unit e, it is preferred that variation of the ratio (composition ratio) of structural unit d and structural unit e in the polymer is small over the entire molecular weight distribution range. Specifically, by confining the composition ratio at any molecular weight with respect to the ratio of specific monomer d and specific monomer e supplied to a polymerization reaction to within a variation range of ±50%, preferably +30%, and more preferably ±20%, a still more uniform specific phase difference film may be obtained. Furthermore, by confining the composition ratio within such a range, the phase difference may be made yet more uniform when stretching and aligning are carried out.

Hereinafter, conditions for producing a specific polymer obtained by ring-opening copolymerizing specific monomer d, and specific monomer e or another copolymerizable monomer, if necessary, or by ring-opening copolymerizing these monomers followed by hydrogenating the ring-opened copolymer obtained will be explained.

Ring-Opening Polymerization Catalyst:

A ring-opening polymerization reaction of monomers is carried out in the presence of a metathesis catalyst.

This metathesis catalyst is a catalyst obtained by combining (a) at least one type selected from compounds of W, Mo, and Re, and (b) at least one type selected from compounds of an element of Group IA in the Deming periodic table (for example, Li, Na, K, and the like), an element of Group IIA (for example, Mg, Ca, and the like), an element of Group IIB (for example, Zn, Cd, Hg, and the like), an element of Group IIIB (for example, B, Al, and the like), an element of Group IVA (for example, Ti, Zr, and the like), or an element of Group IVB (for example, Si, Sn, Pb, and the like), and having at least one bond between the element and carbon or between the element and hydrogen. Further, in this case, in order to enhance the activity of the catalyst, a catalyst to which an additive (c), which will be described later, is added may be used.

(a) Representative examples of the appropriate compound of W, Mo, or Re as the component include compounds described in Japanese Patent Application Laid-Open No. H1-240517, such as $WCl_6$, $MoCl_5$, and $ReOCl_3$.

(b) Specific examples of the component (b) include compounds described in Japanese Patent Application Laid-Open No. H1-240517, such as n-$C_4H_9Li$, $(C_2H_5)_3Al$, $(C_2H_5)_2AlCl$, $(C_2H_5)_{1.5}AlCl_{1.5}$, $(C_2H_5)AlCl_2$, methyl aluminoxane, and LiH.

As the representative example of component (c), alcohols, aldehydes, ketones, amines, and the like may be suitably used, and furthermore, it is possible to use compounds described in Japanese Patent Application Laid Open No. H1-240517.

The amount of metathesis catalyst used is usually in the range of 1:500 to 1:50,000, and preferably in the range of 1:1,000 to 1:10,000, expressed as a molar ratio of component (a) to specific monomer d and specific monomer e (hereinafter, the two are together referred to as "specific monomer").

The ratio of component (a) to component (b) is in the range of 1:1 to 1:50, and preferably 1:2 to 1:30, expressed as a molar ratio "(a):(b)".

The ratio of the component (a) to the component (c) is in the range of 0.005:1 to 15:1, and preferably 0.05:1 to 7:1, expressed as a metal atom ratio "(c):(a)".

Molecular Weight Adjusting Agent:

The molecular weight of the specific polymer may be adjusted by the polymerization temperature, the type of catalyst, and the type of solvent, but in the present invention, it is preferred to adjust the molecular weight of the specific polymer by allowing a molecular weight adjusting agent to coexist in a reaction system. Examples of a suitable molecular weight adjusting agent include α-olefins such as ethylene, propene, 1-butene, 1-pentene, 1-hexene, 1-heptene, 1-octene, 1-nonene, and 1-decene, and styrene, and among them, 1-butene and 1-hexene are preferred.

These molecular weight adjusting agents may be used either alone or in combination of two or more thereof. The amount of molecular weight adjusting agent used is 0.005 to 0.6 mole, and preferably 0.02 to 0.5 mole, per mole of the specific monomer supplied to a polymerization reaction.

Solvent for Ring-Opening Polymerization Reaction:

Examples of the solvent used in the ring-opening polymerization reaction include alkanes such as pentane, hexane, heptane, octane, nonane, and decane; cycloalkanes such as cyclohexane, cycloheptane, cyclooctane, decalin, and norbornane; aromatic hydrocarbons such as benzene, toluene, xylene, ethylbenzene, and cumene; halogenated hydrocarbon compounds such as chlorobutane, bromohexane, methylene chloride, dichloroethane, hexamethylene dibromide, chlorobenzene, chloroform, and tetrachloroethylene; saturated carboxylic acid esters such as ethyl acetate, n-butyl acetate, iso-butyl acetate, and methyl propionate; and ethers such as dimethoxyethane, dibutyl ether, and tetrahydrofuran, and these may be used either alone or in combination of two or more thereof. Among them, the aforementioned aromatic hydrocarbons are preferred.

The amount of solvent used is an amount such that the solvent:specific monomer (weight ratio) is usually 1:1 to 10:1, and preferably 1:1 to 5:1.

Hydrogenation:

The ring-opened copolymer obtained by the ring-opening polymerization above may be used as the specific polymer as it is, but it is preferred that the remaining olefinically unsaturated bond in the ring-opened copolymer is hydrogenated to give a hydrogenated product.

This hydrogenated product has excellent thermal stability, and the properties there of do not easily degrade by heating during film formation processing and stretching processing, or during actual application as a product. In such a hydrogenated product, the hydrogenation ratio of the olefinically unsaturated bond is 50% or more, preferably 70% or more, more preferably 90% or more, and particularly preferably 98% or more. Furthermore, when the ring-opened copolymer that is supplied to hydrogenation has an aromatic ring in the molecule, it is preferred that the aromatic ring is not substantially hydrogenated after the hydrogenation.

A hydrogenation reaction is carried out by a typical method, that is, by adding a hydrogenation catalyst to a solution of the ring-opened copolymer, and carrying out a reaction with hydrogen gas at normal pressure to 300 atm, and preferably 3 to 200 atm, at 0 to 200° C., and preferably 20 to 180° C.

As the hydrogenation catalyst, those usually used in a hydrogenation reaction of an olefinic compound may be used. As this hydrogenation catalyst, heterogeneous catalysts and homogeneous catalysts are publicly known. Meanwhile, when a ring-opened polymer having a substituent with an aromatic ring in the molecule is hydrogenated, it is preferred to select conditions under which unsaturated bonds of the aromatic ring are not substantially hydrogenated. Examples of the heterogeneous catalyst include solid catalysts in which a precious metal such as palladium, platinum, nickel, rhodium, or ruthenium is supported on a support such as carbon, silica, alumina, or titania. Further, examples of the homogeneous catalyst include nickel naphthenate/triethylaluminum, nickel acetylacetonate/triethylaluminum, cobalt octenatehc-butyllithium, titanocene dichloride/diethylaluminum monochloride, rhodium acetate, chlorotris(triphenylphosphine)rhodium, dichlorotris(triphenylphosphine) ruthenium, chlorohydrocarbonyltris(triphenylphosphine) ruthenium, dichlorocarbonyltris(triphenylphosphine) ruthenium, and the like. The catalyst may be in the form of a powder or particles.

These hydrogenation catalysts are used at a ratio in which the ring-opened polymer:hydrogenation catalyst (mass ratio) is $1:1 \times 10^{-6}$ to 1:2.

(Average log P of Monomer Unit)

In addition, the humidity dependence of the elastic modulus of the cycloolefin-based polymer film of the present invention may be adjusted by setting the hydrophilicity of the monomer unit in the range of the following Formula (G).

$$0 \leq \log P(i) \times Mi \leq 4.5 \quad (G)$$

Here, log P(i) is an octanol/water partition coefficient of an i-th structural unit, and Mi is a molar fraction of the i-th structural unit. The octanol/water partition coefficient may be obtained by actual measurement or by calculation.

$1 \leq \log P(i) \times Mi \leq 4$ is more preferred, and $2 \leq \log P(i) \times Mi \leq 3.5$ is most preferred.

When log P (i)×Mi is in the aforementioned range, the change in optical properties and the change in dimensions due to absorption are small, and the close contact with the polyvinyl alcohol of the polarizer is sufficient.

(Manufacture of Film)

In the present invention, a thermoplastic cycloolefin-based resin, preferably a thermoplastic norbornene-based resin, which includes the specific polymer may be molded into a film by a melt molding method, a solution casting method (solvent cast method), and the like, but it is preferred that the solvent cast method is used since it is possible to obtain an unprocessed film having highly uniform thickness and good surface smoothness. Examples of the solvent cast method include a method in which a thermoplastic cycloolefin-based resin is dissolved or dispersed in a solvent so as to prepare a film-forming liquid containing an appropriate concentration of the thermoplastic cyclic olefin-based resin, and this film-forming liquid is poured onto or applied to an appropriate carrier, dried, and then peeled off from the carrier.

When the thermoplastic cycloolefin-based resin is dissolved or dispersed in the solvent, the concentration of the thermoplastic cycloolefin resin is usually adjusted to 0.1 to 90 wt %, preferably 1 to 50 wt %, and more preferably 10 to 35 wt %. When this concentration is in the aforementioned range, an unprocessed film having a required thickness may be obtained, and when the solvent is removed by drying, it is difficult for foaming, and the like to occur according to evaporation of the solvent, and accordingly, an unprocessed film having good surface smoothness may be obtained, and furthermore, since the solution viscosity of the film-forming liquid is not increased, a film having a uniform thickness or surface state may be obtained.

Furthermore, the viscosity of the film-forming liquid is usually 1 to 1,000,000 (mPa·s) at room temperature, preferably 10 to 100,000 (mPa·s), more preferably 100 to 50,000 (mPa·s), and particularly preferably 1,000 to 40,000 (mPa·s).

Examples of the solvent used for preparation of the film-forming liquid include aromatic-based solvents such as benzene, toluene, and xylene, cellosolve-based solvents such as methyl cellosolve, ethyl cellosolve, and 1-methoxy-2-propanol, ketone-based solvents such as diacetone alcohol, acetone, cyclohexanone, methyl ethyl ketone, 4-methyl-2-pentanone, and ethyl cyclohexanone, ester-based solvents such as methyl lactate and ethyl lactate, halogen-containing solvents such as 2,2,3,3-tetrafluoro-1-propanol, methylene chloride, and chloroform, ether-based solvents such as tetrahydrofuran and dioxane, alcohol-based solvents such as 1-pentanol and 1-butanol, and 1,2-dimethylcyclohexane.

Further, in addition to the aforementioned solvents, when a solvent having an SP value (solubility parameter) usually in the range of 10 to 30 $(MPa^{1/2})$, preferably 10 to 25 $(MPa^{1/2})$, more preferably 15 to 25 $(MPa^{1/2})$, and particularly preferably 15 to 20 $(MPa^{1/2})$ is used, a processed film having good surface uniformity and optical properties may be obtained.

The aforementioned solvents may be used either alone or in combination of two or more thereof. When two or more of solvents are used in combination, it is preferred that the SP value of the mixed solvent obtained is within the aforementioned range. Here, the SP value of the mixed solvent may be obtained from a weight ratio of each solvent forming the mixed solvent; for example, for a mixed solvent obtained from two types of solvents, when the weight fractions of each solvent are defined as W1 and W2, and the SP values thereof are also defined as SP1 and SP2, the SP value of the mixed solvent may be calculated by the equation:

$$SP\ value = W1 \cdot SP1 + W2 \cdot SP2.$$

When a mixed solvent is used as the solvent for the film-forming liquid, by combining a good solvent and a poor solvent with respect to the thermoplastic cycloolefin-based resin, preferably a thermoplastic norbornene-based resin, an unprocessed film having a light diffusion function may be obtained. Specifically, when the SP value of the thermoplastic cycloolefin-based resin is denoted by SPx, the SP value of the good solvent for the thermoplastic cycloolefin-based resin is denoted by SPy, and the SP value of the poor solvent for the thermoplastic cycloolefin-based resin is denoted by SPz, by setting the difference between SPx and Spy to be preferably 7 or less, more preferably 5 or less, and particularly preferably 3 or less, the difference between SPx and SPz to be preferably 7 or more, more preferably 8 or more, and particularly preferably 9 or more, and the difference between Spy and SPz to be preferably 3 or more, more preferably 5 or more, and even more preferably 7 or more, it is possible to impart the light diffusion function to an unprocessed film obtained, and as a result, a finally obtained specific phase difference film may have the light diffusion function.

In addition, the ratio of the poor solvent contained in the mixed solvent is preferably 50 wt % or less, more preferably 30 wt % or less, particularly preferably 15 wt % or less, and most preferably 10 wt % or less. Furthermore, the difference between the boiling point of the poor solvent and the boiling point of the good solvent is preferably 1° C. or more, more preferably 5° C. or more, particularly preferably 10° C. or more, and most preferably 20° C. or more, and particularly, it is preferred that the boiling point of the poor solvent is higher than the boiling point of the good solvent.

The temperature at which the thermoplastic cycloolefin-based resin, preferably a thermoplastic norbornene-based resin is dissolved or dispersed in a solvent may be room temperature or a high temperature, and by sufficiently stirring the solution, a film-forming liquid in which the thermoplastic cycloolefin-based resin is uniformly dissolved or dispersed may be obtained. Further, if necessary, a coloring agent such as a dye or a pigment may be appropriately added to the film-forming liquid, and accordingly, a colored unprocessed film may be obtained.

In addition, for the purpose of improving the surface smoothness of an unprocessed film obtained, a leveling agent may be added to the film-forming liquid. As such a leveling agent, various types of leveling agents may be used as long as the leveling agent are generally used, and specific examples thereof include a fluorine-based nonionic surfactant, a special acrylic resin-based leveling agent, a silicone-based leveling agent, and the like.

As a carrier for forming a liquid layer of the film-forming liquid, it is possible to use a metal drum, a steel belt, a polyester film formed of polyethylene terephthalate (PET), polyethylene naphthalate (PEN), and the like, a polytetrafluoroethylene-made belt and the like. As a method for applying the film-forming liquid, it is possible to use a method using a die or a coater, a spray method, a brushing method, a roll coating method, a spin coating method, a dipping method and the like.

Furthermore, by repeatedly applying the film-forming liquid, it is also possible to control the thickness or surface smoothness of an unprocessed film obtained.

Further, when a polyester film is used as the carrier, a surface-treated film may be used.

Examples of the surface treatment method include a generally performed hydrophilization treatment method such as, for example, a method in which an acrylic resin or a sulfonate group-containing resin is stacked by coating or laminating or a method in which the hydrophilicity of the film surface is improved by a corona discharge treatment, and the like.

In the solvent casting method, a specific method for removing the solvent in the liquid layer is not particularly limited, and a generally used drying method such as, for example, a method of making the film pass through a drying oven using a plurality of rollers may be used, but when air bubbles are generated according to evaporation of the solvent in the drying step, the properties of the finally obtained specific phase difference film are significantly degraded, and therefore it is preferred that in order to avoid this, the drying step is divided into a plurality of two or more steps, and the temperature or blowing rate for each step is controlled.

The amount of residual solvent in the unprocessed film thus obtained is usually 10 wt % or less, preferably 5 wt % or less, more preferably 1 wt % or less, and particularly preferably 0.5 wt % or less. Here, when the amount of residual solvent in the unprocessed film is in the aforementioned range, the change in dimensions over time is small when a specific phase difference film obtained by stretching and processing the unprocessed film is put into practical use, which is preferred. In addition, the range is preferred because the glass transition temperature is not lowered by the residual solvent, and the heat resistance does not deteriorate, either.

Furthermore, in order to appropriately carry out stretching processing, which will be described below, the amount of residual solvent in the unprocessed film needs to be adjusted within the aforementioned range in some cases. Specifically, in order to stably and uniformly exhibit a phase difference in the film by a stretching alignment treatment, the amount of residual solvent in the unprocessed film is usually set at 10 to 0.1 wt %, preferably 5 to 0.1 wt %, and more preferably 1 to 0.1 wt % in some cases. By leaving a trace amount of solvent in the unprocessed film, the stretching alignment treatment is easily performed, or the phase difference is easily controlled in some cases.

In the present invention, the thickness of the unprocessed film is usually 1 to 30 μm (1,000 to 60,000 nm), preferably 5 to 30 μm (500 to 30,000 nm), and more preferably 10 to 20 μm (1,000 to 20,000). When the thickness is in the aforementioned range, it is easy to handle the unprocessed film, and when the unprocessed film is wound up in the form of a roll, the so-called "curling" is not imparted, and accordingly, it is easy to handle the film during post-processing and the like.

The thickness distribution of the unprocessed film is usually within +20%, preferably within ±10%, more preferably within ±5%, and particularly preferably within ±3% relative to an average value. Further, the variation in thickness per cm is usually 10% or less, preferably 5% or less, more preferably 1% or less, and particularly preferably 0.5% or less. By controlling the thickness distribution of the unprocessed film within the aforementioned range, it is possible to prevent the unevenness of phase difference from occurring when the unprocessed film is subjected to the stretching alignment treatment.

Specific examples of a stretching processing method for producing a specific phase difference film include a uniaxial stretching method or biaxial stretching method, which is publicly known.

That is, it is possible to use a transverse uniaxial stretching method using a tenter method, a roll-to-roll compression stretching method, a longitudinal uniaxial stretching method using two pairs of rolls having different circumferences, a biaxial stretching method using a combination of transverse uniaxial and longitudinal uniaxial, a stretching method using an inflation method, and the like.

In the case of the uniaxial stretching method, the stretching speed is usually 1 to 5,000%/min, preferably 50 to 1,000%/min, more preferably 100 to 1,000%/min, and particularly preferably 100 to 500%/min.

In the case of the biaxial stretching method, there are a case in which stretching is carried out simultaneously in two directions and a case in which, after uniaxial stretching, a stretching treatment is carried out in a direction that is different from the initial stretching direction. In this case, the intersection angle between two stretching axes for controlling the shape of a refractive index ellipsoid of the film after stretching is determined according to desired properties, and thus is not particularly limited, but the angle is usually in the range of 120 to 60 degrees. In addition, the stretching speed may be the same as or different from each other in each stretching direction, and is usually 1 to 5,000%/min, preferably 50 to 1,000%/min, more preferably 100 to 1,000%/min, and particularly preferably 100 to 500%/min.

The treatment temperature in the stretching alignment treatment is not particularly limited, but is usually Tg±30° C., preferably Tg±15° C., and more preferably in the range of Tg−5° C. to Tg+15° C., based on the glass transition temperature Tg of the thermoplastic cycloolefin-based resin used, preferably a thermoplastic norbornene-based resin. By controlling the treatment temperature within the aforementioned range, it is possible to suppress the occurrence of unevenness of phase difference, and it also becomes easy to control the refractive index ellipsoid, which is preferred.

The stretching magnification is determined according to desired properties, and thus is not particularly limited, but is usually 1.01 to 10 times, preferably 1.03 to 5 times, and more preferably 1.03 to 3 times. When the stretching magnification is in the aforementioned range, it is easy to control the phase difference.

The stretched film may be cooled as it is, but it is preferred that the film is heat set by maintaining the film under an atmosphere at a temperature of Tg−20° C. to Tg for at least 10 seconds or more, preferably 30 seconds to 60 minutes, and more preferably 1 minute to 60 minutes. Accordingly, it is possible to obtain a phase difference film in which a variation in phase difference of transmitted light over time is small and stable.

When the specific phase difference film is heated at 100° C. for 500 hours, the dimensional shrinkage of the specific phase difference film due to the heating is usually 10% or less, preferably 5% or less, more preferably 3% or less, and particularly preferably 1% or less.

In order to control the dimensional shrinkage within the aforementioned range, it is possible to carry out such control not only by selecting, for example, specific monomer a, specific monomer b, or the other copolymerizable monomers, which are raw materials for the thermoplastic cycloolefin-based resin, but also by the casting method or the stretching method. Meanwhile, the dimensional shrinkage due to heating of the unprocessed film in a state in which a stretching alignment treatment is not performed is usually 5% or less, preferably 3% or less, more preferably 1% or less, and particularly preferably 0.5% or less, when heating is carried out at 100° C. for 500 hours.

In the film stretched as described above, molecules are aligned by stretching, thereby imparting a phase difference to transmitted light, and this phase difference may be controlled by adjusting the type of thermoplastic norbornene-based resin used as a raw material, the stretching magnification, the stretching treatment temperature, or the thickness of the film prior to stretching (unprocessed film), and the like. For example, with regard to the stretching magnification, even though films have the same thickness prior to stretching, the films have a tendency that the larger the stretching magnification is, the larger the absolute value of the phase difference of transmitted light is, and therefore a film that imparts a desired phase difference to transmitted light may be obtained by changing the stretching magnification. Furthermore, with regard to the thickness of the film prior to stretching (unprocessed film), even though films have the same stretching magnification, the films have a tendency that the larger the thickness of the film prior to stretching is, the larger the absolute value of the phase difference imparted to transmitted light is, and therefore a phase difference film that imparts a desired phase difference to transmitted light may be obtained by changing the thickness of the film prior to stretching. Further, with regard to the stretching temperature, since the film shows a tendency that the lower the stretching temperature, the larger the absolute value of the phase difference of transmitted light, a phase difference film that imparts a desired phase difference to transmitted light may be obtained by changing the stretching temperature.

In addition, in order to adjust the thickness of the specific phase difference film, the thickness may be controlled by adjusting the thickness of the unprocessed film, the stretching magnification, and the like. Specifically, for example, by reducing the thickness of the unprocessed film or increasing the stretching magnification thereof, the thickness of the phase difference film may be made small.

In such a specific phase difference film, the number of bright dots on the film surface, converted to the number per m2, is 10 or less, preferably 7 or less, more preferably 5 or less, particularly preferably 3 or less, and most preferably 0 or 1.

Here, the term "bright dots" refers to partial light leakage that is visually confirmed when observing the specific phase difference film sandwiched between polarizing plates in a crossed Nicol state, and those having an outer diameter of 1 μm or more (the diameter for a circular shape, and the length in the longitudinal direction for other shapes) are usually measured.

Of course, those smaller than the above are measured as bright dots in some cases, depending on the required performance. Furthermore, it is thought that such bright dots are caused by partial unevenness of the phase difference in a micro region. That is, it is thought that, when extraneous substances, bubbles and the like are present in the unprocessed film, even though these materials are too small to be visually confirmed, stress is concentrated in a portion where the extraneous substances, bubbles and the like are present when the film is subjected to stretching processing, such that the phase difference of the portion where stress is concentrated may become different from the phase difference of a peripheral portion thereof, and therefore such a difference in the phase difference causes light to leak.

Further, in the specific phase difference film, the number of extraneous substances on the film surface, converted to the number per m2, is preferably 10 or less, more preferably 5 or less, particularly preferably 3 or less, and most preferably 0 or 1.

The term "extraneous substance" referred to here means one that substantially prevents light from being transmitted when light is allowed to pass through the specific phase difference film. When such an extraneous substance is present in the specific phase difference film, the strength of the transmitted light is affected, and when the film is used for a liquid crystal display device, and the like, there is a concern in that pixel omission or deterioration in properties may be caused.

Meanwhile, the size of an extraneous substance that is to be measured is usually 1 μm or more for the outer diameter (the diameter for a circular shape, and the length in the longitudinal direction for other shapes), but those with a smaller outer diameter than the above are measured as extraneous substances in some cases, depending on the required performance.

<Surface Treatment of Film>

It is preferred that the first protective film preferably has at least one surface thereof subjected to hydrophilization in order to secure close contact with a polarizer.

With regard to the surface treatment method, for example, there are methods in which an adhesive layer is formed, described in Japanese Patent Application Laid-Open Nos. 2000-24167, 2002-148436, 2002-90546, and 2001-350017, and hydrophilicity may also be imparted by a surface treatment such as a corona discharge treatment described in Japanese Patent Application Laid-Open No. 2001-350018.

The first protective film may be either an unstretched film or a stretched film. When the first protective film is a stretched film, the film may be either a uniaxial stretched film or a biaxial stretched film. When the film is a biaxial stretched film, the film may be either a simultaneously biaxially stretched film or a sequentially biaxially stretched film. When the film is biaxially stretched, mechanical strength of the film is improved, thereby improving the performance of the film. Even though the synthetic polymer film is stretched by being mixed with another thermoplastic resin, the synthetic polymer film may suppress an increase in the phase difference, thereby maintaining optical isotropy.

The stretching temperature is preferably in the vicinity of the glass transition temperature of the thermoplastic resin composition which is a raw material for the film, and specifically, the stretching temperature is in the range of preferably (glass transition temperature−30° C.) to (glass transition temperature+100° C.), and more preferably (glass transition temperature−20° C.) to (glass transition temperature+80° C.). When the stretching temperature is less than (glass transition temperature−30° C.), there is a concern in that a sufficient stretching magnification may not be obtained. Conversely, when the stretching temperature exceeds (glass transition temperature+100° C.), there is a concern in that flow of the resin composition occurs, so that stable stretching may not be performed.

The stretching magnification which is defined as an area ratio is preferably 1.1 to 25 times, and more preferably 1.3 to 10 times. When the stretching ratio is less than 1.1 times, there is a concern in that there will be no improvement in toughness according to stretching. When the stretching magnification exceeds 25 times, there is a concern in that an effect obtained by increasing the stretching magnification is not recognized.

The stretching speed in one direction is preferably 10 to 20,000%/min, and more preferably 100 to 10,000%/min. When the stretching speed is less than 10%/min, there is a concern in that it takes time to obtain a sufficient stretching magnification, so that manufacturing costs are increased. When the stretching speed exceeds 20,000%/min, there is a concern in that breakage of the stretched film and the like occur.

A heat treatment (annealing) and the like may be performed on the first protective film after the stretching processing in order to stabilize the optical isotropy and mechanical properties. Any appropriate conditions may be adopted as the conditions of the heat treatment.

(Film Thickness of First Protective Film)

The thickness of the first protective film is 30 μm or less, preferably 1 to 30 μm, more preferably 5 to 30 μm, and even more preferably 10 to 20 from the viewpoint that it is difficult for unevenness to occur. When the thickness exceeds 30 μm, transparency deteriorates and moisture permeability is reduced, so that when a water-based adhesive is used, there is a concern in that the drying speed of water which is a solvent becomes slow. Further, when a high temperature and high humidity durability test is performed, there is a concern in that light leakage unevenness may occur on a screen of a liquid crystal display device. When the thickness is 1 μm or more, strength is enhanced, so that when a durability test is performed on the polarizing plate, the crimp is not significant, which is preferred.

The thickness of the first protective film is an average film thickness measured by observing the cross-section of the film by an optical microscope.

(Humidity Dimensional Change Rate of First Protective Film)

In the first protective film, the humidity dimensional change rate represented by the following Equation (1) in the TD direction is preferably 0.1% or less, more preferably 0% to 0.1%, and even more preferably 0% to 0.05% from the viewpoint of stability of optical properties.

Humidity dimensional change rate (%) in the TD direction=[{(length of a film in the TD direction at 25° C. and a relative humidity of 80%)− (length of a film in the TD direction at 25° C. and a relative humidity of 10%)}/(length of a film in the TD direction at 25° C. and a relative humidity of 60%)]×100     Equation (1);

In the first protective film, the humidity dimensional change rate represented by Equation (1) in a direction parallel to the absorption axis of the polarizer (a conveying direction of the film during the manufacture of the film: MD direction) is also preferably 0.5% or less, more preferably 0.25% or less, and even more preferably 0.1% or less, similarly to that in the TD direction from the viewpoint of stability of optical properties. The smaller the humidity dimensional change rate of the first protective film, the smaller the shrinkage or expansion of the first protective film that occurs when the humidity change occurs. Accordingly, a force applied on an adhesive for adhering a polarizing plate to glass constituting a liquid crystal cell, or the liquid crystal cell, is reduced, and as a result, light leakage due to photoelasticity is reduced.

The wetting tension of the surface of the first protective film is preferably 40 mN/m or more, more preferably 50 mN/m or more, and even more preferably 55 mN/m or more. When the wetting tension of the surface is at least 40 mM/m or more, the strength of adhesion between the (meth)acrylic resin film and the polarizer is further enhanced. In order to adjust the wetting tension of the surface, an arbitrary appropriate surface treatment may be performed. Examples of the surface treatment include corona discharge treatment, plasma treatment, ozone spraying, UV-ray irradiation, flame treatment, and chemical treatment. Among them, corona discharge treatment and plasma treatment are preferably used.

The elastic modulus of the first protective film in the TD direction is 2.0 GPa to 2.5 GPa. When the elastic modulus in the TD direction is 2.5 GPa or less, the occurrence of unevenness due to photoelasticity is reduced.

It is preferred that when the polarizing plate of the present invention is inserted into a liquid crystal display device, the first protective film is disposed at the liquid crystal cell side (inner side).

It is preferred to adopt the first protective film as an inner side film from the viewpoint that unevenness is suppressed from being generated when the film is used under high temperature and high humidity for a long time.

[Second Protective Film]

The second protective film has an evaluation value represented by the following Equation (2) of 7.0 to 11.0.

Evaluation value=elastic modulus (GPa) of the second protective film in the $TD$ direction/humidity dimensional change rate (%) of the second protective film in the $TD$ direction×(thickness (μm) of the second protective film/thickness (μm) of the first protective film)$^2$×(30/thickness (μm) of the polarizer)$^{1/2}$    Equation (2):

Meanwhile, the humidity dimensional change rate of the second protective film in the TD direction is represented by the following Equation (1).

Humidity dimensional change rate (%) in the $TD$ direction=[{(length of a film in the $TD$ direction at 25° C. and a relative humidity of 80%)−(length of a film in the $TD$ direction at 25° C. and a relative humidity of 10%)}/(length of a film in the $TD$ direction at 25° C. and a relative humidity of 60%)]×100;    Equation (1):

By setting the thickness, the elastic modulus in the TD direction, and the humidity dimensional change in the TD direction of the second protective film within the specific ranges as described above, a polarizing plate which is excellent in manufacturing suitability of a liquid crystal display device may be obtained from the viewpoint of curls.

In the present invention, the process of deriving Equation (2) will be described.

Figure 4:
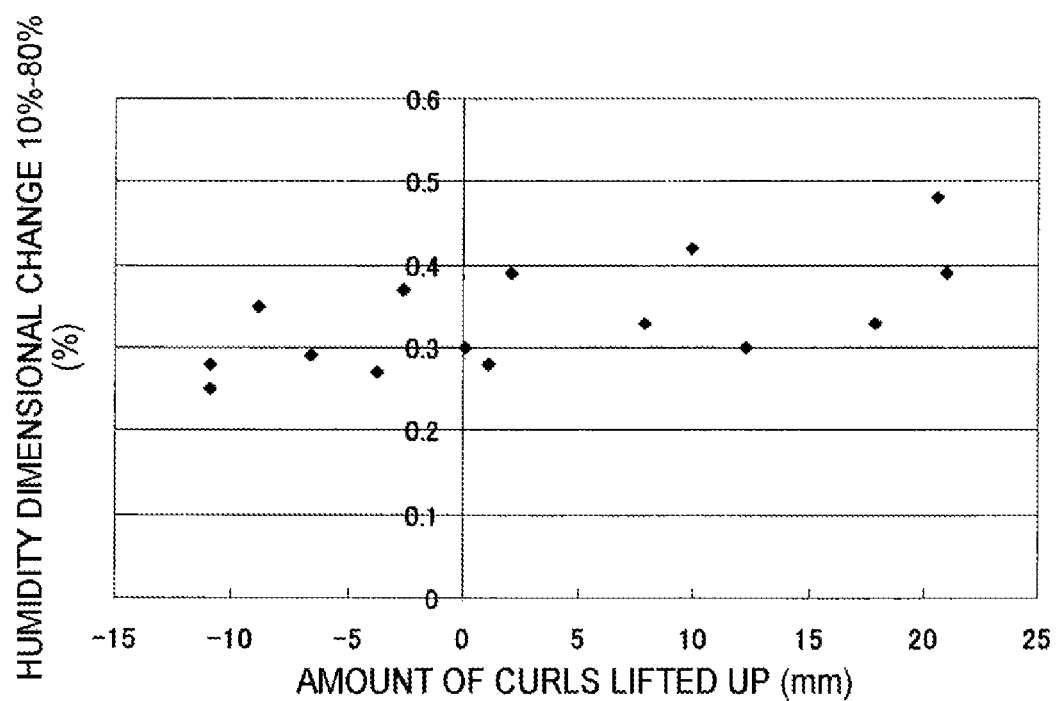
FIG. 4 is a view illustrating the relationship between the humidity dimensional change rate of a second protective film and the amount of curls lifted up of the polarizing plate.

First, the relationship of the amount of curls lifted up of the polarizing plate with humidity dimensional change rate of the second protective film in the TD direction is illustrated in FIG. 4. From FIG. 4, no relationship between the humidity dimensional change rate of the second protective film in the TD direction and the amount of curls lifted up of the polarizing plate may be found.

Figure 5:
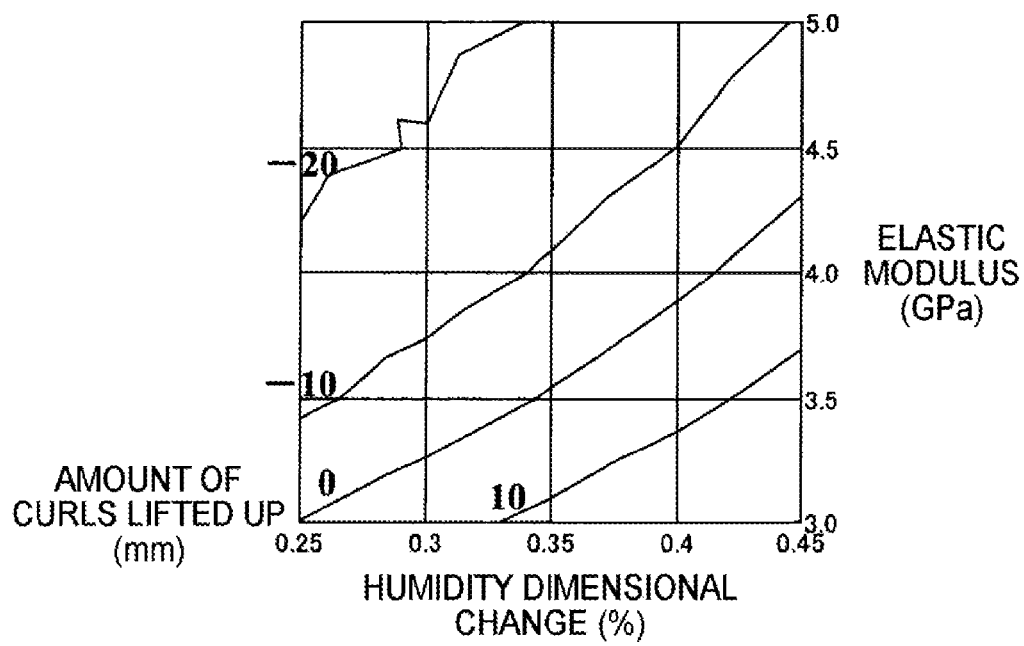
FIG. 5 is a view illustrating the relationship between the humidity dimensional change rate of the second protective film, the elastic modulus of the second protective film, and the contour of the amount of curls lifted up of the polarizing plate.

Subsequently, with respect to the amount of curls lifted up, there has been investigated a relationship between the humidity dimensional change rate of the second protective film in the TD direction and the elastic modulus of the second protective film in the TD direction. FIG. 5 illustrates a curl map illustrating the humidity dimensional change rate of the second protective film in the TD direction, the elastic modulus of the second protective film in the TD direction, and the contour of the amount of curls lifted up of the polarizing plate.

From FIG. 5, it has been found that the contour of curls is shown in a direction in which the elastic modulus in the TD direction and the humidity dimensional change rate simultaneously move up and down. From this, it is presumed that there is a preferred range in the ratio of the elastic modulus in the TD direction and the humidity dimensional change rate in the TD direction.

Thus, the relationship between Evaluation Value 1 represented by the following Equation (3) and the amount of curls lifted up has been investigated.

Figure 6:
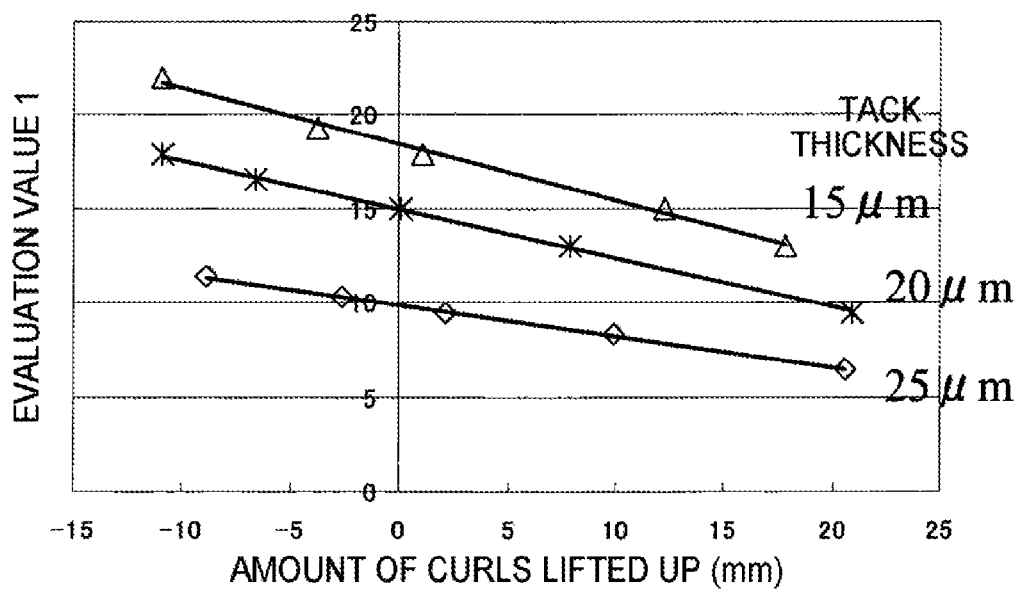
FIG. 6 is a view illustrating the relationship between Evaluation Value 1 and the amount of curls lifted up of the polarizing plate.

Evaluation Value 1=elastic modulus (GPa) of the second protective film in the $TD$ direction/humidity dimensional change rate (%) of the second protective film in the $TD$ direction    Equation (3):

FIG. 6 illustrates the relationship between the amount of curls lifted up and Evaluation Value 1 when the film thickness of polyvinyl alcohol of a polarizer is 30 μm, the film thickness of a cycloolefin-based polymer film which is a first protective film is 25 μm, and the film thickness of a cellulose acylate film which is a second protective film is 15 μm, 20 μm, and 25 μm.

From FIG. 6, it can be known that when the thickness of the cellulose acylate film is constant, the relationship between Evaluation Value 1 and the amount of curls lifted up is linear, but when the thicknesses are different, the relationship does not correspond.

Thus, the relationship between Evaluation Value 2 represented by the following Equation (4) when the thickness is corrected and the amount of curls lifted up has been reviewed.

Figure 7:
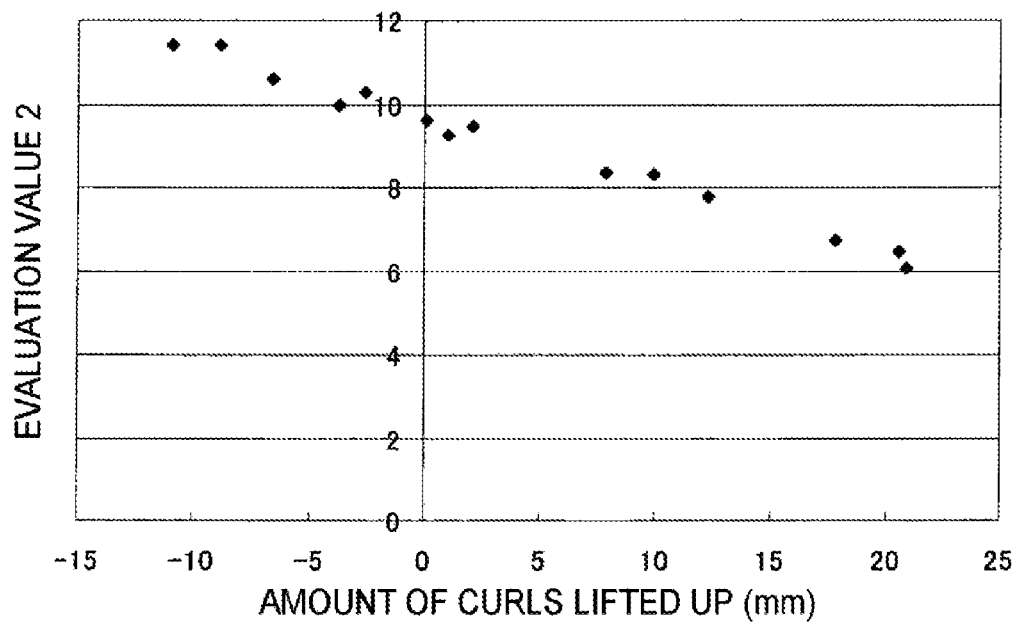
FIG. 7 is a view illustrating the relationship between Evaluation Value 2 and the amount of curls lifted up of the polarizing plate.

Evaluation Value 2=elastic modulus (GPa) of the second protective film in the $TD$ direction/humidity dimensional change rate (%) of the second protective film in the $TD$ direction×(thickness (μm) of the second protective film/thickness (μm) of the first protective film)$^2$    Equation (4):

FIG. 7 illustrates the relationship between the amount of curls lifted up and Evaluation Value 2 when the film thickness of polyvinyl alcohol of the polarizer is 30 μm.

From FIG. 7, it can be known that the amount of curls lifted up and Evaluation Value 2 correspond to each other well.

Figure 8:
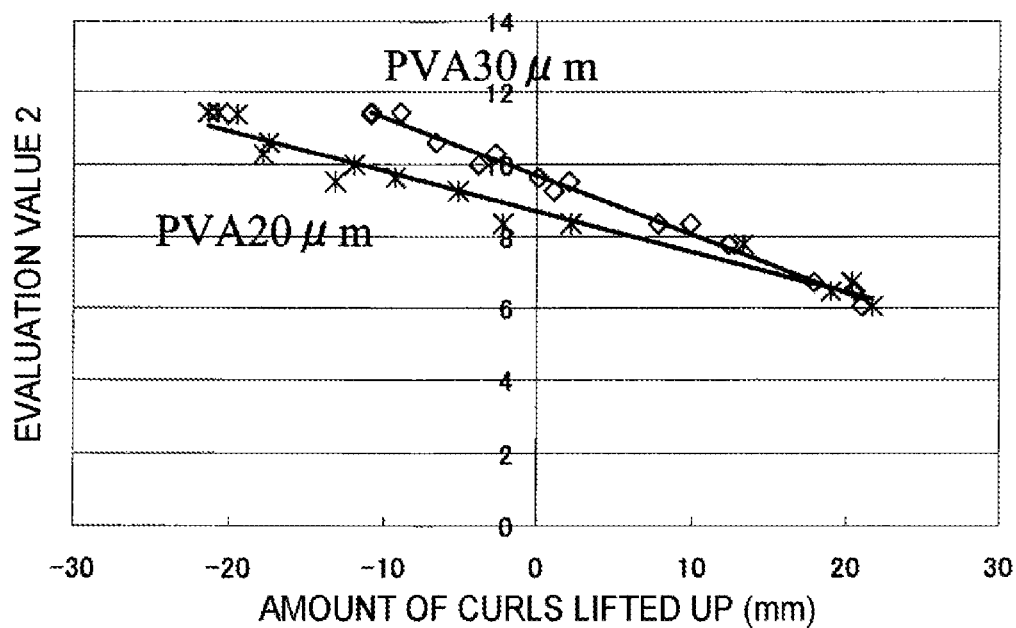
FIG. 8 is a view illustrating the relationship between Evaluation Value 2 and the amount of curls lifted up of the polarizing plate when the film thickness of the polarizer is changed.

Subsequently, with respect to the case where the thickness of the polarizer is changed, the relationship between Evaluation 2 and the amount of curls lifted up have been reviewed. FIG. 8 illustrates the relationship between the amount of curls lifted up and Evaluation Value 2 when the film thickness of polyvinyl alcohol of the polarizer is 30 μm and 20 μm.

From FIG. 8, it can be known that when the thickness of the polarizer varies, a preferred region of Evaluation Value 2 varies. More specifically, it can be known that when the thickness of the polarizer is reduced, the slope of the straight line showing the corresponding relationship of the amount of curls lifted up and Evaluation Value 2 is reduced. In addition, as an evaluation value in which the thickness of the polarizer is corrected, an evaluation value represented by the following Equation (2) is adopted.

Figure 9:
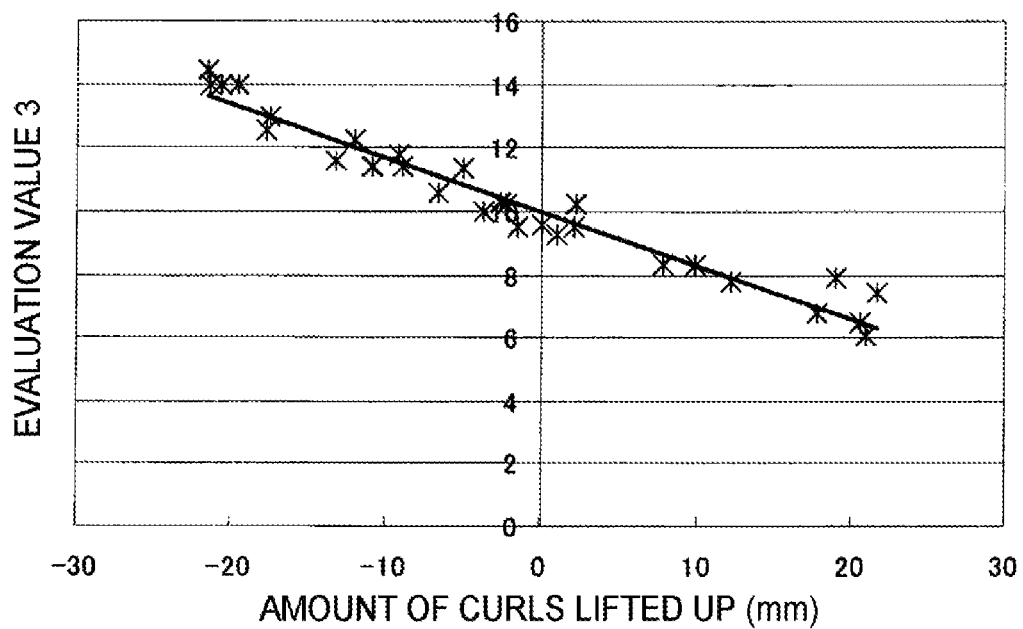
FIG. 9 is a view illustrating the relationship between the evaluation value represented by Formula (2) in the present invention and the amount of curls lifted up of the polarizing plate.

Evaluation value=elastic modulus (GPa) of the second protective film in the *TD* direction/humidity dimensional change rate (%) of the second protective film in the *TD* direction×(thickness (μm) of the second protective film/thickness (μm) of the first protective film)$^2$×(30/thickness (μm) of the polarizer)$^{1/2}$   Equation (2):

FIG. 9 illustrates the relationship between an evaluation value (Evaluation Value 3) by Equation (2) and the amount of curls lifted up.

From FIG. 9, it can be known that an evaluation value by Equation (2) and the amount of curls lifted up show a linear relationship, but the relationship corresponds well.

From the viewpoint of the low frequency of occurrence of errors, such as entrainment of bubbles and misalignment in adhering a polarizing plate to a liquid crystal cell, the evaluation value represented by Equation (2) is preferably 7.0 to 11.0, more preferably 9.0 to 10.0, particularly preferably 9.0 to 9.8, and most preferably 9.0 to 9.6.

A material which constitutes the second protective film is not particularly limited.

It is preferred that the second protective film includes a resin, and as the resin, a publicly known resin may be used, and the resin is not particularly limited as long as the resin does not deviate from the spirit of the present invention, but examples thereof include cellulose acylate, a (meth)acrylic resin, a cycloolefin-based resin, and a polyester-based resin, and cellulose acylate is preferred.

(Cellulose Acylate)

Hereinafter, cellulose acylate which may be used for the second protective film, will be described in detail.

The degree of substitution of cellulose acylate means a ratio at which the three hydroxyl groups present in each constitutional unit ((β)1,4-glycoside bonded glucose) of cellulose are acylated. The degree of substitution (degree of acylation) may be calculated by measuring the quantity of fatty acids bonded per unit mass of the constitutional unit of cellulose. In the present invention, the degree of substitution of a cellulose body may be calculated by dissolving the cellulose body in a solvent such as deuterium-substituted dimethyl sulfoxide, measuring the 13C-NMR spectrum thereof, and obtaining the degree of substitution from the peak intensity ratio of the carbonyl carbon in the acyl group. The remaining hydroxyl group in the cellulose acylate is substituted with another acyl group different from the acyl group that the cellulose acylate itself has, and then the degree of substitution may be obtained by 13C-NMR measurement. The details of the measurement method are described in Tezuka, et al. (Carbohydrate, Res., 273 (1995) 83-91).

The total degree of acyl substitution of cellulose acylate is preferably 2.0 to 2.97, more preferably 2.2 to 2.95, and particularly preferably 2.3 to 2.95.

An acyl group of cellulose acylate is particularly preferably an acetyl group, a propionyl group, and a butyril group, and more particularly preferably an acetyl group.

A mixed fatty acid ester composed of two or more of acyl groups may also be preferably used as the cellulose acylate in the present invention. Even in this case, the acyl group is preferably an acetyl group and an acyl group having 3 and 4 carbon atoms. In addition, when a mixed fatty acid ester is used, the degree of substitution of the acetyl group is preferably less than 2.5, and more preferably less than 1.9. Meanwhile, the degree of substitution of the acyl group having 3 to 4 carbon atoms is preferably 0.1 to 1.5, more preferably 0.2 to 1.2, and particularly preferably 0.5 to 1.1.

In the present invention, two types of cellulose acylates that are different in the substituent and/or the degree of substitution thereof may be used in combination or mixture; or films composed of a plurality of layers composed of different cellulose acylates may be formed by a co-casting method or the like to be described below.

Furthermore, the mixed acid ester having a fatty acid acyl group and a substituted or unsubstituted aromatic acyl group, which is described in [0023] to [0038] of Japanese Patent Application Laid-Open No. 2008-20896, may also be preferably used in the present invention.

The cellulose acylate has a mass average polymerization degree of preferably 250 to 800, and more preferably 300 to 600.

Further, the cellulose acylate has a number average molecular weight of preferably 70,000 to 230,000, more preferably 75,000 to 230,000, and most preferably 78,000 to 120,000.

The cellulose acylate may be synthesized by using an acid anhydride or an acid chloride as an acylating agent. When the acylating agent is an acid anhydride, an organic acid (for example, acetic acid) or methylene chloride is used as a reaction solvent. In addition, a protic catalyst such as sulfuric acid may be used as a catalyst. When the acylating agent is an acid chloride, a basic compound may be used as the catalyst. In a most industrially common synthesis method, a cellulose is esterified with a mixed organic acid component including an organic acid (acetic acid, propionic acid, and butyric acid) corresponding to an acetyl group and other acyl groups or an acid anhydride thereof (acetic anhydride, propionic anhydride, and butyric anhydride) to synthesize a cellulose ester.

In the aforementioned method, there are many cases where a cellulose such as a cotton linter or a wood pulp is subjected to activation treatment with an organic acid such as acetic acid, and then esterified by using a mixture solution of the organic acid component as described above in the presence of a sulfuric acid catalyst. The organic acid anhydride component is used generally in an excessive amount relative to the amount of the hydroxyl group present in cellulose. In the esterification treatment, a hydrolysis reaction (depolymerization reaction) of the cellulose main chain ((β)-1,4-glycoside bond) proceeds in addition to the esterification reaction. When the hydrolysis reaction of the main chain proceeds, the degree of polymerization of the cellulose ester is reduced, so that the physical properties of a cellulose ester film to be prepared deteriorate. For that reason, it is preferred that the reaction conditions such as a reaction temperature are determined in consideration of the degree of polymerization or molecular weight of the cellulose ester to be obtained.

(Additives)

The second protective film may include an organic acid or other publicly known additives used in the polarizing plate protective film as long as the organic acid or other publicly known additives do not deviate from the spirit of the present invention. Accordingly, the additive may be an aid for controlling the humidity dimensional change rate. The molecular weight of the additive is not particularly limited, but an additive to be described below may be preferably used.

By adding an additive, a useful effect is exhibited in addition to controlling the humidity dimensional change rate, from the viewpoint of improving a film, such as improving thermal, optical and mechanical properties of the film, imparting flexibility, imparting resistance to water absorption, and reducing water permeability.

Examples of controlling mechanical properties include addition of a plasticizer to the film, and as a case of a plasticizer for reference, reference may be made to various ester-based plasticizers which are already known, such as phosphoric acid ester, citric acid ester, trimellitic acid ester and sugar ester, or polyester-based polymers as described in paragraph nos. 0042 to 0068 of the pamphlet of International Publication No. 2011/102492.

Furthermore, for controlling optical properties, in imparting capacity of absorbing ultraviolet or infrared ray, reference may be made to paragraph nos. 0069 to 0072 of International Publication No. 2011/102492, and an already known retardation adjusting agent may be used in order to adjust the phase difference of the film or control exhibiting properties. Accordingly, the additive may be an aid for controlling the humidity dimensional change rate. The molecular weight of the additive is not particularly limited, but an additive to be described below may be preferably used.

(Thickness of Second Protective Film)

The thickness of the second protective film is preferably 5 to 30 μm, more preferably 10 to 30 μm, and particularly preferably 15 to 25 μm. The thickness of 30 μm or less is preferred from the viewpoint of making a liquid crystal display slimmer. Meanwhile, when the thickness is 5 μm or more, it is difficult for the polarizing plate to be broken when the polarizing plate is conveyed during the processing of the polarizing plate, so that scratches are not easily generated on the surface of the polarizing plate.

The thickness of the second protective film is an average film thickness measured by observing the cross-section of the film by an optical microscope.

The amount of additive added is preferably 10% by mass or more, more preferably 15% by mass or more, and even more preferably 20% by mass or more relative to the cellulose acylate from the viewpoint exhibiting the various effects. The upper limit is preferably 80% by mass or less, and preferably 65% by mass or less. When two or more additives are used, the total amount thereof is preferably within the aforementioned range.

(Moisture Permeability)

The moisture permeability of the second protective film is preferably 10 g/m$^2$·day or more from the viewpoint of drying speed during the manufacture of the polarizing plate. The moisture permeability of the second protective film is more preferably 10 to 500 g/m$^2$·day, even more preferably 100 to 500 g/m$^2$·day, and more particularly 200 to 450 g/m$^2$·day.

The value of moisture permeability in the present specification is a value obtained by measuring the mass (g) of water vapor passing through a sample having an area of 1 m$^2$ within 24 hours in an atmosphere having a temperature of 40° C. and a relative humidity of 92%, in accordance with the moisture permeability test (cup method) of JIS Z0208.

<Method for Manufacturing Second Protective Film>

With respect to a method for manufacturing the second protective film, a method for manufacturing a film using a (meth)acrylic resin, a cycloolefin-based resin, and a polyester-based resin is not particularly limited, but for example, a resin, other polymers or additives and the like may be sufficiently mixed by any appropriate mixing method to prepare a thermoplastic resin composition in advance, and then the composition may be molded into a film. Otherwise, the resin, other polymers or additives and the like may be each prepared into a solution, each solution may be mixed to prepare a uniform solution, and then the solution may be molded into a film. In order to prepare the thermoplastic resin composition, for example, the aforementioned film raw materials are pre-blended with any appropriate mixer such as an omni mixer, and then the obtained mixture is extruded and kneaded. In this case, the mixer used for the extrusion and kneading is not particularly limited, but for example, any suitable mixer such as an extruder such as a single screw extruder and a twin screw extruder, or a pressure kneader may be used.

Examples of the method of molding a film include any suitable film molding methods such as a solution cast method (solution casting method), a melt extrusion method, a calendaring method, and a compression molding method. Of those film molding methods, a solution cast method (solution casting method) and a melt extrusion method are preferred. The method for manufacturing a second protective film will be described in detail by exemplifying the case where the second protective film is a film including cellulose acylate (also referred to as "cellulose acylate film").

The cellulose acylate film may be manufactured by a solvent cast method. Hereinafter, the method for manufacturing the polarizing plate protective film including an organic acid will be described by exemplifying an aspect in which cellulose acylate is used as a substrate, but the polarizing plate protective film may also be manufactured likewise even when other resins are used. In the solvent cast method, a solution (dope) in which cellulose acylate is dissolved in an organic solvent is used to manufacture a film.

It is preferred that the organic solvent includes a solvent selected from an ether having 3 to 12 carbon atoms, a ketone having 3 to 12 carbon atoms, an ester having 3 to 12 carbon atoms and a halogenated hydrocarbon having 1 to 6 carbon atoms.

The ether, the ketone and the ester may have a cyclic structure. In addition, a compound having two or more of any one of functional groups of the ether, the ketone and the ester (that is, —O—, —CO— and —COO—) may also be used as the organic solvent. The organic solvent may have other functional groups such as an alcoholic hydroxyl group. In the case of an organic solvent having two or more of functional groups, it is preferred that the carbon number thereof is within the aforementioned preferred range of the number of carbon atoms of the solvent having any one functional group.

Examples of the ethers having 3 to 12 carbon atoms include diisopropyl ether, dimethoxy methane, dimethoxy ethane, 1,4-dioxane, 1,3-dioxolane, tetrahydrofuran, anisole and phenetole.

Examples of the ketones having 3 to 12 carbon atoms include acetone, methyl ethyl ketone, diethyl ketone, diisobutyl ketone, cyclohexanone and methylcyclohexanone.

Examples of the esters having 3 to 12 carbon atoms include ethyl formate, propyl formate, pentyl formate, methyl acetate, ethyl acetate and pentyl acetate.

Furthermore, examples of the organic solvent having two or more of functional groups include 2-ethoxyethyl acetate, 2-methoxy ethanol and 2-butoxy ethanol.

The number of carbon atoms in the halogenated hydrocarbon having 1 to 6 carbon atoms is preferably 1 or 2, and most preferably 1. The halogen in the halogenated hydrocarbon is preferably chlorine. The ratio of hydrogen atoms in the halogenated hydrocarbon to be substituted by halogens is preferably 25 to 75% by mole, more preferably 30 to 70% by mole, even more preferably 35 to 65% by mole, and most preferably 40 to 60% by mole. Methylene chloride is a representative halogenated hydrocarbon.

Further, the organic solvent may be used in a mixture of two or more thereof.

A cellulose acylate solution (dope) may be prepared by a general method of performing a treatment at a temperature of 0° C. or more (normal temperature or high temperature). The cellulose acylate solution may be prepared using a method and an apparatus for preparing a dope in a typical solvent cast method. Meanwhile, in the case of the general method, it is preferred that a halogenated hydrocarbon (particularly, methylene chloride) is used as an organic solvent.

The amount of cellulose acylate in the cellulose acylate solution is adjusted so as to be included in an amount of 10 to 40% by mass in the solution obtained. The amount of cellulose acylate is even more preferably 10 to 30% by mass. Any additives to be described below may be added in the organic solvent (main solvent).

The cellulose acylate solution may be prepared by stirring the cellulose acylate and the organic solvent at normal temperature (0 to 40° C.). A solution at a high concentration may be stirred under pressure and heating conditions. Specifically, cellulose acylate and an organic solvent are charged into a pressure vessel and after sealing the vessel, the mixture is stirred under pressure while heating at a temperature in a range from a temperature not less than the boiling point of the solvent at normal temperature to a temperature not allowing for boiling of the solvent. The heating temperature is usually 40° C. or more, preferably 60 to 200° C., and more preferably 80 to 110° C.

Each component may be roughly mixed in advance and then charged into the vessel. In addition, the components may be sequentially introduced into the vessel. The vessel needs to be configured such that the vessel may be stirred. The vessel may be pressurized by injecting an inert gas such as a nitrogen gas into the vessel. Furthermore, a rise in vapor pressure of the solvent due to heating may be used. Alternatively, after sealing the vessel, each component may be added under pressure.

In the case of carrying out heating, it is preferred that heating is carried out from the outside of the vessel. For example, a jacket-type heating device may be used. Further, the entire vessel may also be heated by providing a plate heater outside the vessel and laying a pipe to circulate a liquid thereinto.

It is preferred that a stirring blade is provided in the vessel and stirring is performed by using the stirring blade. A stirring blade having a length long enough to reach near the wall of the vessel is preferred. It is preferred that a scraping blade is provided at the terminal of the stirring blade for the purpose of renewing a liquid film on the wall of the vessel.

The vessel may be provided with measuring meters such as a pressure gauge and a thermometer. In the vessel, each component is dissolved in a solvent. The prepared dope is cooled and then taken out from the vessel, or taken out from the vessel and then cooled by using a heat exchanger or the like.

The cellulose acylate solution may also be prepared by a cooling dissolution method. For details on the cooling dissolution method, it is possible to use a technology described in to [0122] of Japanese Patent Application Laid-Open No. 2007-86748.

A cellulose acylate film is prepared from the prepared cellulose acylate solution (dope) by the solvent cast method. It is preferred that a retardation developer is added to the dope. The dope is cast on a drum or a band, and the solvent is vaporized to form a film. It is preferred that the dope before casting is adjusted so as to have a concentration of 18 to 35% in terms of solid content. It is preferred that the surface of the drum or band is mirror-finished. It is preferred that the dope is cast on a drum or a band at a surface temperature of 10° C. or less.

Drying methods in the solvent cast method are described in U.S. Pat. Nos. 2,336,310, 2,367,603, 2,492,078, 2,492,977, 2,492,978, 2,607,704, 2,739,069, and 2,739,070, British Patent Nos. 640731 and 736892, and Japanese Patent Nos. S45-4554 and S49-5614 and Japanese Patent Application Laid-Open Nos. S60-176834, S60-203430, and S62-115035.

The dope on the band or drum may be dried by blowing air and an inert gas such as nitrogen.

In addition, the obtained film is peeled off from the drum or band and may also be dried by high-temperature air by sequentially varying the temperature from 100° C. to 160° C., thereby evaporating the residual solvent. The aforementioned method is described in Japanese Patent No. H5-17844. According to the method, it is possible to shorten the time from casting to peeling-off. In order to carry out this method, the dope needs to be gelled at the surface temperature of the drum or band during casting.

A film may also be formed by using the prepared cellulose acylate solution (dope) to cast the solution in two or more layers. In this case, it is preferred that the cellulose acylate film is manufactured by a solvent cast method. The dope is cast on a drum or a band, and the solvent is vaporized to form a film. It is preferred that the dope before casting is adjusted so as to have a concentration in a range of 10% to 40% by mass in terms of solid content. It is preferred that the surface of the drum or band is mirror-finished.

In the case of casting a plurality of cellulose acylate solutions in two or more layers, it is possible to cast a plurality of cellulose acylate solutions, and a film may be manufactured by each casting and stacking a solution including cellulose acylate from a plurality of casting nozzles formed at intervals in the support traveling direction. It is possible to use the method described in, for example, Japanese Patent Application Laid-Open Nos. S61-158414, H1-122419 and H11-198285. Furthermore, a film may also be formed by casting a cellulose acylate solution from two casting nozzles. It is possible to use the method described in, for example, Japanese Patent No. S60-27562 and Japanese Patent Application Laid-Open Nos. S61-94724, S61-947245, S61-104813, S61-158413 and H6-134933. Further, it is also possible to use a method for casting a cellulose acylate film, including: surrounding the flow of a high viscosity cellulose acylate solution with a low viscosity cellulose acylate solution; and simultaneously extruding the high and low viscosity cellulose acylate solutions, which is described in Japanese Patent Application Laid-Open No. S56-162617.

Further, a film may also be prepared by using two casting nozzles to peel off a film formed on a support by means of a first casting nozzle and then performing a second casting at the side that is in contact with the support surface. Examples of the method include a method described in Japanese Patent No. S44-20235.

As the cellulose acylate solutions to be cast, the same solutions may be used and two or more of other cellulose acylate solutions may be used. In order to allow a plurality of cellulose acylate layers to have functions, cellulose acylate solutions according to the functions may be extruded from each casting nozzle. In addition, the cellulose acylate solution in the present invention may be cast simultaneously with other functional layers (for example, an adhesive layer, a dye layer, an antistatic layer, an anti-halation layer, an ultraviolet ray absorbing layer, a polarizing layer and the like).

(Addition of Organic Acid)

When an organic acid is added to the cellulose acylate solution, the timing for the addition is not particularly limited as long as the organic acid is added at the time of forming a film. For example, the organic acid may be added at the time of synthesizing cellulose acylate, and may be mixed with cellulose acylate at the time of preparing the dope.

(Addition of Other Additives)

A deterioration inhibitor (for example, an antioxidant, a peroxide decomposer, a radical inhibitor, a metal deactivator, an acid scavenger, amine and the like) may also be added to the second protective film. The deterioration inhibitor is described in Japanese Patent Application Laid-Open Nos. H3-199201, H5-1907073, H5-194789, H5-271471 and H6-107854. Further, the amount of deterioration inhibitor added is preferably 0.01 to 1% by mass based on the solution to be prepared (dope), and more preferably 0.01 to 0.2% by mass. When the addition amount is 0.01% by mass or more, the effect of the deterioration inhibitor may be sufficiently exhibited, which is preferred, and when the addition amount is 1% by mass or less, it is difficult for bleed-out (leaching) of the deterioration inhibitor to the film surface and the like to occur, which is preferred. Particularly preferred examples of the deterioration inhibitor include butylated hydroxytoluene (BHT) and tribenzylamine (TBA).

In addition, in the second protective film, a particle is preferably added as a matting agent. Examples of the particle include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. A particle including silicon is preferred in that the turbidity is reduced, and silicon dioxide is particularly preferred. As the particle of silicon dioxide, those having a primary average particle diameter of 20 inn or less and an apparent specific gravity of 70 g/L or more are preferred. The apparent specific gravity is preferably 90 to 200 g/L, and more preferably 100 to 200 g/L. A larger apparent specific gravity is preferred because a dispersion with a high concentration may be prepared, and thus the haze and the aggregated material are improved.

These particles usually form secondary particles with an average particle diameter of 0.1 to 3.0 µm, are present as an aggregate of the primary particles in a film, and form unevenness of 0.1 to 3.0 µm on the surface of the film. The secondary average particle diameter is preferably 0.2 µm to 1.5 µm, more preferably 0.4 µm to 1.2 µm, and even more preferably 0.6 µm to 1.1 µm. Particles in a film are observed under a scanning electron microscope, and the primary or secondary particle diameter is defined as a diameter of the circle circumscribed to the particle. Furthermore, 200 particles are observed by changing the site and the average value thereof is defined as the average particle diameter.

As the particle of silicon dioxide, it is possible to use commercially available products, for example, AEROSIL R972, R972V, R974, R812, 200, 200V, 300, 8202, OX50 and TT600 (all manufactured by Nippon Aerosil Co., Ltd.). As the particle of zirconium oxide, products under the product names of, for example, AEROSIL R976 and R811 (both manufactured by Nippon Aerosil Co., Ltd.) are commercially available, and thus may be used.

Among them, AEROSIL 200V and AEROSIL R972V are particularly preferred because these particles are a silicon dioxide particle having a primary average particle diameter of 20 nm or less and an apparent specific gravity of 70 g/L or more and provide a high effect of reducing the frictional coefficient of an optical film while maintaining turbidity of the optical film at a low level, which are preferred.

In order to obtain a polarizing plate protective film having particles with a small secondary average particle diameter, several techniques may be considered when a dispersion of particles is prepared. For example, there is a method of in advance preparing a particle dispersion in which a solvent and particles are mixed by stirring to add the particle dispersion to a small amount of a separately prepared cellulose acylate solution and dissolve the resulting solution by stirring, and then mixing the mixture with a main cellulose acylate solution (doping solution). This method is a preferred preparation method in that silicon dioxide particles may be dispersed well and it is difficult for silicon oxide particles to be further re-aggregated. In addition to the method, there is also a method of adding a small amount of a cellulose ester to a solvent to be dissolved by stirring, adding the particles thereto to be dispersed by a dispersing machine and prepare a particle addition solution, and sufficiently mixing the resulting particle addition solution with a doping solution by an in-line mixer. The present invention is not limited to these methods, but in mixing and dispersing the silicon dioxide particles in a solvent and the like, the concentration of silicon dioxide is preferably 5 to 30% by mass, more preferably 10 to 25% by mass, and most preferably 15 to 20% by mass. A higher dispersion concentration is preferred because the concentration results in a lower liquid turbidity for the amount of addition, thereby leading to improvement in haze and aggregated materials. The amount of matting agent particles added in a final cellulose acylate doping solution is preferably 0.01 to 1.0 g per m$^3$, more preferably 0.03 to 0.3 g per m$^3$ and most preferably 0.08 to 0.16 g per m$^3$.

Examples of solvents used preferably include lower alcohols, such as methyl alcohol, ethyl alcohol, propyl alcohol, isopropyl alcohol, butyl alcohol, and the like. Solvents other than lower alcohols are not particularly limited, but it is preferred that a solvent used during the film formation of cellulose ester is used.

The processes from casting to post-drying may be performed under air atmosphere or under inert gas atmosphere, such as nitrogen gas. A winding machine used in preparing the polarizing plate protective film in the present invention may be the one generally used, and the film may be wound according to a winding method, such as a constant tension method, a constant torque method, a taper tension method, and a program tension control method of constant internal stress.

(Stretching Treatment)

The second protective film may also be subjected to stretching treatment. The stretching treatment may impart a desired retardation to the polarizing plate protective film. As for the stretching direction of the cellulose acylate film, any of the width direction and the longitudinal direction is preferred.

The stretching method in the width direction is described in, for example, Japanese Patent Application Laid-Open Nos. S62-115035, H4-152125, H4-284211, H4-298310, H11-48271, and the like.

It is preferred that the second protective film is stretched under heating conditions. The film may be stretched by treatment under drying, and the treatment is effective particularly when the solvent remains. In the case of stretching in the longitudinal direction, for example, the film is stretched by adjusting the speed of a roller that conveys the film to make the winding speed of the film faster than the peel-off speed of the film. In the case of stretching in the width direction, the film may also be stretched by conveying the film while keeping the width of the film by a tenter, and gradually increasing the width of the tenter. It is also possible to stretch the film using a stretching machine (preferably uniaxial stretching using a long stretching machine) after drying the film.

The film is stretched by using the glass transition temperature Tg of the film preferably at a temperature of (Tg−5° C.) to (Tg+40° C.), more preferably Tg to (Tg+35° C.) and particularly preferably (Tg+10° C.) to (Tg+30° C.). In the case of a dried film, the temperature is preferably 130° C. to 200° C.

Furthermore, when the film is stretched while the doping solvent is remaining after the casting, it is possible to stretch the film at a temperature lower than that of the dried film, and in this case, the temperature is preferably 100° C. to 170° C.

The stretching magnification of the second protective film (elongation ratio relative to the film before stretching) is preferably 1% to 200%, and more preferably 5% to 150%. In particular, the film is stretched in the width direction at preferably 1% to 200%, more preferably 5% to 150% and particularly preferably 30% to 45%.

The stretching speed is preferably 1%/min to 300%/min, more preferably 10%/min to 300%/min, and most preferably 30%/min to 300%/min.

Further, it is preferred that the second protective film is prepared by, after being stretched to a maximum stretching magnification, subjecting the film to a process of holding the film at a stretching magnification lower than the maximum stretching magnification for a predetermined time (hereinafter, referred to as a "relaxing process" in some cases). The stretching magnification in the relaxing process is preferably 50% to 99%, more preferably 70% to 97% and most preferably 90% to 95%, based on the maximum stretching magnification. In addition, the time for the relaxing process is preferably 1 second to 120 seconds, and more preferably 5 seconds to 100 seconds.

Furthermore, the polarizing plate protective film may be preferably prepared by including a shrinking process of shrinking the film in the width direction while gripping the film.

In the preparation method including a stretching process of stretching the film in the width direction of the film and a shrinking process of shrinking the film in the conveying direction (longitudinal direction) of the film, the film is held in a pantograph-type or linear motor-type tenter, and the gap between clips is gradually decreased in the conveying direction while stretching the film in the width direction, thereby shrinking the film.

In the method described above, at least a part of the stretching process and the shrinking process may be simultaneously performed.

Meanwhile, as a stretching device for specifically performing the aforementioned stretching process of stretching the film either in a longitudinal direction or in a width direction, simultaneously shrinking the film in one direction, and simultaneously increasing the film thickness of the film, a FITZ machine manufactured by ICHIKIN Co., Ltd. and the like may be preferably used. This device is described in (Japanese Patent Application Laid-Open No. 2001-38802).

For the stretching magnification in the stretching process and the shrinking ratio in the shrinking process, an appropriate value may be arbitrarily selected according to desired values of in-plane retardation (Re) and retardation (Rth) in a thickness direction, and it is preferred that the stretching magnification in the stretching process is set to 10% or more and the shrinking ratio in the shrinking process is set to 5% or more.

In particular, the method preferably includes a stretching process of stretching the film by 10% or more in the width direction of the film, and a shrinking process of shrinking the film by 5% or more in the conveying direction while gripping the film in the width direction of the film.

Meanwhile, the shrinking ratio mentioned in the present invention means a ratio of the shrunk length of the film after shrinkage to the length of the film before shrinkage in the shrinking direction.

The shrinking ratio is preferably 5 to 40%, and particularly preferably 10 to 30%.

It is preferred that when the polarizing plate of the present invention is inserted into a liquid crystal display device, the second protective film is disposed at the outer side (a side opposite to the liquid crystal cell).

It is preferred that the second protective film is adopted as the outer side film from the viewpoint that it is difficult for scratches to be generated on the surface of the liquid crystal display device.

[Method for Manufacturing Polarizing Plate]

Hereinafter, the method for manufacturing the polarizing plate of the present invention will be described in the order of a method for stacking a polarizing plate protective film and a polarizer and functionalization of the polarizing plate.

(Saponification Treatment)

The polarizing plate protective films (first protective film and second protective film) may be used as a polarizing plate protective film by subjecting the protective films to alkali saponification treatment to impart adhesion with a material for the polarizer, such as polyvinyl alcohol.

With respect to the saponification method, it is possible to use a method described in and [0212] of Japanese Patent Application Laid-Open No. 2007-86748.

For example, the alkali saponification treatment for the polarizing plate protective film is preferably performed in a cycle of immersing the surface of the film in an alkali solution, neutralizing the film surface with an acid solution, washing the film surface with water and drying the surface. Examples of the alkali solution include a potassium hydroxide solution and a sodium hydroxide solution, and the concentration of hydroxide ions is preferably in a range of 0.1 to 5.0 mol/L and more preferably in a range of 0.5 to 4.0 mol/L. The alkali solution temperature is preferably in a range of room temperature to 90° C., and more preferably 40 to 70° C.

Instead of the alkali saponification treatment, an adhesion facilitating processing as described in Japanese Patent Application Laid-Open Nos. H6-94915 and H6-118232 may be performed.

<Method for Stacking Polarizer and Polarizing Plate Protective Film>

It is preferred that the method for manufacturing a polarizing plate of the present invention includes a step of stacking two polarizing plate protective films on both surfaces of the polarizer of the present invention, which is obtained above.

In the method for manufacturing a polarizing plate of the present invention, the polarizing plate is preferably manufactured by a method of subjecting the polarizing plate protective film to alkali treatment, and using an adhesion bond to adhere the polarizing plate protective film on both surfaces of the polarizer.

Examples of an adhesion bond used in adhering the treated surface of the polarizing plate protective film to the polarizer include a polyvinyl alcohol-based adhesion bond, such as polyvinyl alcohol and polyvinyl butyral, a vinyl-based latex, such as butyl acrylate, and the like.

It is preferred that from the viewpoint of manufacturing suitability in roll-to-roll, the polarizing plate of the present invention is stacked such that the absorption axis of the polarizer is substantially orthogonal to a direction (TD direction) orthogonal to the conveying direction of the films when the polarizing plate protective films (first protective film and second protective film) are manufactured. Here, in being substantially orthogonal, the angle between the absorption axis of the polarizer and the TD direction of the polarizing plate protective film is 85° to 95°, and preferably 89° to 91°. When the deviation from being orthogonal is within 5° (preferably within 1°), it is difficult for the performance of the degree of polarization to deteriorate under the crossed Nicols of the polarizing plate, and it is difficult for light leakage to occur, which is preferred.

Figure 2:
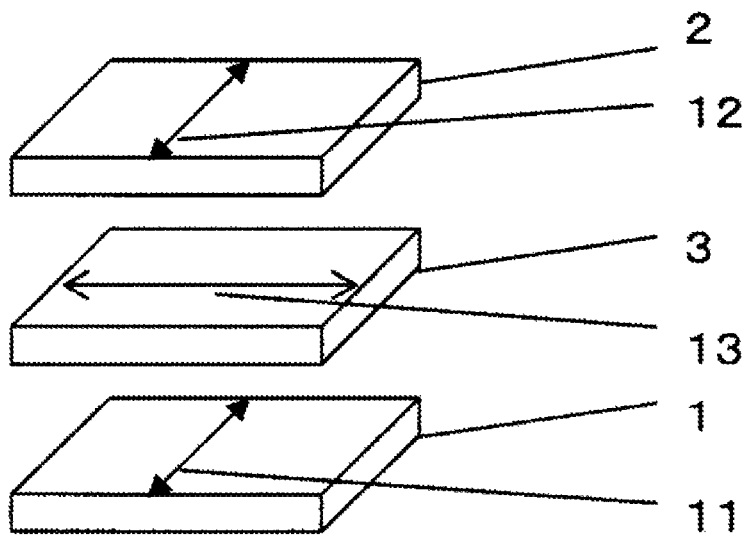
FIG. 2 is a schematic view illustrating an example of the polarizing plate of the present invention.

FIG. 2 illustrates an example of the polarizing plate of the present invention. In FIG. 2, an absorption axis 13 of a polarizer 3 is orthogonal to a TD direction 11 of a first protective film 1 during the manufacture of the film and a TD direction 12 of a second protective film 2 during the manufacture of the film.

[Polarizing Plate]

<Performance of Polarizing Plate>

Preferred optical properties and the like of the polarizing plate of the present invention are described in [0238] to [0255] of Japanese Patent Application Laid-Open No. 2007-086748, and it is preferred that these properties are satisfied.

<Shape and Configuration>

The shape of the polarizing plate of the present invention includes not only a polarizing plate with an aspect of a film piece cut into a size capable of being incorporated into a liquid crystal display device as it is, but also a polarizing plate with an aspect in which the polarizing plate is manufactured to have a long shape by continuous production and is wound up in a roll shape (for example, an aspect of a roll length of 2,500 m or more or 3,900 m or more). In order to manufacture a polarizing plate for a large screen liquid crystal display device, the width of the polarizing plate is preferably 1,470 mm or more.

The thickness of the polarizing plate is preferably 40 μm to 80 μm, more preferably 45 μm to 70 μm, and even more preferably 50 μm to 60 μm. The thickness of the polarizing plate is preferably 80 μm or less because it is difficult for warpage of the liquid crystal display due to shrinkage of the polarizing plate to occur, which is preferred, and a thickness of 60 μm or less is particularly preferred. Meanwhile, the thickness of the polarizing plate is preferably 40 μm or more because it is difficult for bending to occur during the conveying in processing the polarizing plate, so that the polarizing plate easily passes through the processing line.

The polarizing plate of the present invention includes a polarizer and a polarizing plate protective film stacked on both surfaces of the polarizer. As described above, among the two polarizing plate protective films, when the films are adhered to the liquid crystal cell, a film placed at the liquid crystal cell side is called an inner side film, and a film placed at the opposite side is called an outer side film. It is preferred that the first protective film becomes the inner side film, and the second protective film becomes the outer side film. It is also preferred that the polarizing plate of the present invention is also configured by adhering a protection film adhered onto one surface of the polarizing plate and a separate film onto the other surface thereof.

Both the protection film and the separate film are used for the purpose of protecting the polarizing plate during shipment of the polarizing plate, inspection of the product or the like. In this case, the protection film is adhered for the purpose of protecting the surface of the polarizing plate, and used at the side opposite to the surface for adhering the polarizing plate to the liquid crystal plate. Further, the separate film is used for the purpose of covering the adhesive layer which is adhered to the liquid crystal plate, and used at the side of a surface for adhering the polarizing plate to the liquid crystal plate.

<Functionalization of Polarizing Plate>

The polarizing plate of the present invention is preferably used as a functionalized polarizing plate complexed with an antireflection film for improving the visibility of a display, a luminance improving film, or an optical film having a functional layer such as a hard coat layer, a forward scattering layer, and an antiglare (prevention of glaring) layer. An antireflection film, a luminance improving film, another functional optical film, a hard coat layer, a forward scattering layer and an antiglare layer for functionalization are described in to [0276] of Japanese Patent Application Laid-Open No. 2007-86748, and a functionalized polarizing plate may be prepared based on the description.

The polarizing plate of the present invention is preferably any one of the following aspects.

(1) A polarizing plate having a first protective film, a polarizer, and a second protective film in this order, in which the first protective film is a film including a synthetic polymer, and has a thickness of 30 μm or less and an elastic modulus in the TD direction of 2.0 GPa to 2.5 GPa, the polarizer has a thickness of 20 μm, and the second protective film has an evaluation value A represented by the following Equation (2') of 5.7 to 9.0:

$$\text{Evaluation value } A = \text{elastic modulus (GPa) of the second protective film in the } TD \text{ direction/humidity dimensional change rate (\%) of the second protective film in the } TD \text{ direction} \times (\text{thickness (μm) of the second protective film/thickness (μm) of the first protective film})^2 \quad \text{Equation (2'):}$$

(2) A polarizing plate having a first protective film, a polarizer, and a second protective film in this order, in which the first protective film is a film including a synthetic polymer, and has a thickness of 30 μm or less and an elastic modulus in the TD direction of 2.0 GPa to 2.5 GPa, the polarizer has a thickness of 25 μm, and the second protective film has an evaluation value A represented by the following Equation (2') of 6.5 to 10.0:

$$\text{Evaluation value } A = \text{elastic modulus (GPa) of the second protective film in the } TD \text{ direction/humidity dimensional change rate (\%) of the second protective film in the } TD \text{ direction} \times (\text{thickness (μm) of the second protective film/thickness (μm) of the first protective film})^2 \quad \text{Equation (2'):}$$

(3) A polarizing plate having a first protective film, a polarizer, and a second protective film in this order, in which the first protective film is a film including a synthetic polymer, and has a thickness of 30 μm or less and an elastic modulus in the TD direction of 2.0 GPa to 2.5 GPa, the polarizer has a thickness of 30 μm, and the second protective film has an evaluation value A represented by the following Equation (2') of 7.0 to 11.0:

$$\text{Evaluation value } A = \text{elastic modulus (GPa) of the second protective film in the } TD \text{ direction/humidity dimensional change rate (\%) of the second protective film in the } TD \text{ direction} \times (\text{thickness (μm) of the second protective film/thickness (μm) of the first protective film})^2 \quad \text{Equation (2'):}$$

[Liquid Crystal Display Device]

A liquid crystal display device of the present invention has the polarizing plate of the present invention as at least one of a polarizing plate at the backlight side and a polarizing plate at the viewing side.

In particular, in the polarizing plate of the present invention, it is preferred that the first protective film including a (meth)acrylic resin is included so as to be placed at the liquid crystal cell side (inner side).

Figure 3:
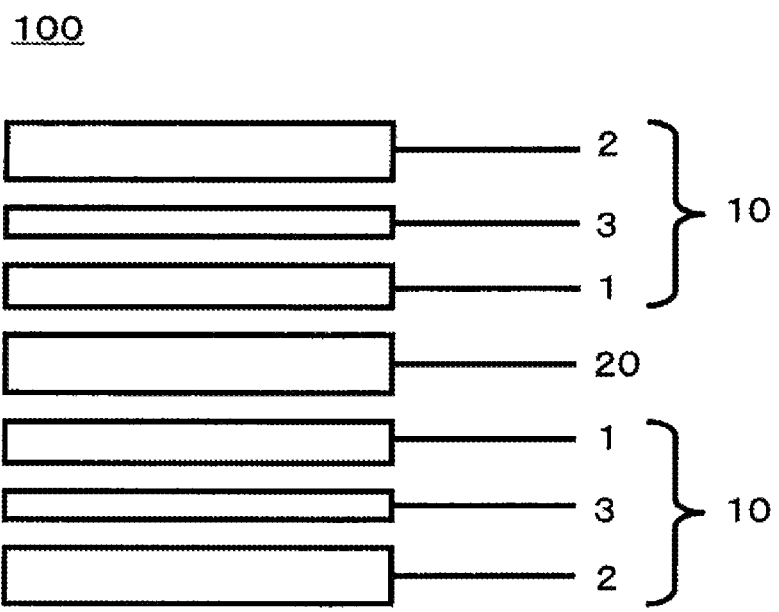
FIG. 3 is a schematic view illustrating an example of a liquid crystal display device of the present invention.

FIG. 3 illustrates a schematic view of a preferred example of the liquid crystal display device of the present invention.

A liquid crystal display device 100 illustrated in FIG. 3 has a polarizing plate 10 of the present invention having a first protective film 1, a polarizer 3 and a second protective film 2 at both sides of a liquid crystal cell 20. The liquid crystal display device 100 has the polarizing plate 10 such that the first protective film 1 is disposed at the side (inner side) of the liquid crystal cell 20.

It is preferred that in order to manufacture a liquid crystal display device of normal black, the absorption axes of the polarizers 3 in the two polarizing plates 10 are disposed so as to be orthogonal to each other.

EXAMPLES

Hereinafter, the present invention will be described in more detail with reference to Examples. The materials, reagents, amounts and ratios of substances, operations and the like shown in the following Examples may be appropriately modified as long as they do not depart from the spirit of the present invention. Therefore, the scope of the present invention is not limited to the following specific examples.

[Manufacture of Inner Side Film]

[Film 1]

In the following Example, the term "part" represents "part by mass".

<Synthesis of Resin a-1>

A reaction vessel substituted with nitrogen was charged with 227 parts of 8-methyl-8-methoxycarbonyltetracyclo[$4.4.0.1^{2,5}.1^{7,10}$]-3-dodecene as specific monomer d, 26 parts of 5-methoxycarbonylbicyclo[2.2.1]hept-2-ene as specific monomer e, 17 parts of 1-hexene as a molecular weight adjusting agent, and 753 parts of toluene as a solvent, and the resulting solution was heated to 60° C. Subsequently, to the solution in the reaction vessel were added 0.62 parts of a toluene solution containing 1.5 mol/l of triethyl aluminum as a polymerization catalyst and 3.8 parts of a toluene solution with a concentration of 0.05 mol/l, containing tungsten hexachloride modified with t-butanol and methanol (t-butanol:methanol:tungsten=0.35 mol:0.3 mol:1 mol), and the system was stirred with heating at 85° C. for 3 hours to allow the ring opening polymerization reaction to proceed, thereby obtaining a ring-opened copolymer solution.

The polymerization conversion rate in the polymerization reaction was 96%, and the intrinsic viscosity ($\eta_{inh}$) of the ring-opened copolymer constituting the obtained ring-opened copolymer solution, measured in chloroform at 30° C., was 0.64 dl/g.

4,000 parts of the obtained ring-opened copolymer solution was placed in an autoclave, 0.48 parts of carbonyl chlorohydride tris(triphenylphosphine)ruthenium: RuHCl(CO)[P($C_6H_5$)$_3$]$_3$ was added to the ring-opened copolymer solution, and the resulting mixture was then stirred with heating under the conditions of a hydrogen gas pressure of 100 kg/cm$^2$ and at a reaction temperature of 165° C. for 3 hours to perform the hydrogenation reaction.

The reaction solution obtained (hydrogenated polymer solution) was cooled, and the hydrogen gas was released. The reaction solution was poured into a large amount of methanol, an aggregate was separated, recovered, and dried to obtain a hydrogenated polymer (hereinafter, "Resin (a-1)").

The hydrogenation ratio of Resin (a-1) obtained was measured using 400 MHz 1H-NMR spectrum, and was found to be 99.9%.

Furthermore, the ratio of structural unit e derived from 5-methoxycarbonyl bicyclo[2.2.1]hept-2-ene in Resin (a-1) was calculated from measurement of 400 MHz 1H-NMR spectrum and based on the absorption peak appearing in the vicinity of about 3.7 ppm due to protons on methyl of methyl ester of structural unit d derived from 8-methyl-8-methoxycarbonyl tetracyclo[$4.4.0.1^{2,5}.1^{7,10}$]-3-dodecene, and the absorption peak appearing at 0.15 to 3 ppm due to protons of the alicyclic structure of structural unit d and structural unit e, and found to be 19.5%. Further, a fraction having a polystyrene converted weight average molecular weight Mw of 10,000 or less, a fraction in a range of more than 10,000 and 30,000 or less, and a fraction more than 30,000 were collected by gel permeation chromatography (GPC), and as a result of confirming the ratio of structural unit e in each sample by 400 MHz 1H-NMR spectrum, the variation width for a value of 19.5%, which was the ratio for the entire Resin (a-1), was within 15% for all the samples.

The solution viscosity of the solution obtained at room temperature was 30,000 mPa·s. Pentaerythrityltetrakis[3-(3,5-di-t-butyl-4-hydroxyphenyl)propionate] was added as an antioxidant to this solution at 0.1 parts by weight relative to 100 parts by weight of Resin (a-1), and the solution obtained was filtered using a metal fiber sintered filter having a pore size of 5 µm, which is manufactured by Pall Corporation, while controlling the flow rate of the solution such that a differential pressure was within 0.4 MPa, and was then applied to a PET film having a thickness of 100 µm ("Lumirror U94" manufactured by Toray Industries, Inc.) that had been hydrophilized (adhesion promoted) with an acrylic acid-based surface treatment agent using an "INVEX Laboratory coater" manufactured by Inoue Metalworking Industry Co., Ltd., which was placed in a class 1000 clean room.

Subsequently, the liquid layer obtained was subjected to a primary drying treatment at 50° C., then a secondary drying treatment at 90° C., and then peeled off from the PET film to form Film 1 having a thickness of 25 µm. Film 1 obtained had a residual solvent level of 0.5 wt % and a light transmittance of 93% or more.

[Film 2]

Film 2 having a thickness of 20 µm was formed by adjusting the amount of solution applied on the PET film in the same manner as in Film 1.

[Film 25]

<Synthesis of Resin a-2>

A reaction vessel substituted with nitrogen was charged with 225 parts of 8-methyl-8-8-methoxycarbonyl-9-methoxycarbonyltetracyclo[$4.4.0.1^{2,5}.1^{7,10}$]-3-dodecene as specific monomer d, 25 parts of bicyclo[2.2.1]hept-2-ene as specific monomer e, 18 parts of 1-hexene as a molecular weight adjusting agent, and 753 parts of toluene as a solvent, and the resulting solution was heated to 60° C. Subsequently, to the solution in the reaction vessel were added 0.62 parts of a toluene solution containing 1.5 mol/l of tricthyl aluminum as a polymerization catalyst and 3.8 parts of a toluene solution with a concentration of 0.05 mol/l, containing tungsten hexachloride modified with t-butanol and methanol (t-butanol:methanol:tungsten=0.35 mol:0.3 mol:1 mol), and the system was stirred with heating at 85° C. for 3 hours to allow the ring opening polymerization reaction to proceed, thereby obtaining a ring-opened copolymer solution. The polymerization conversion rate in the polymerization reaction was 95%, and the intrinsic viscosity ($\eta_{inh}$) of the ring-opened copolymer constituting the obtained ring-opened copolymer solution, measured in chloroform at 30° C., was 0.68 dl/g.

4,000 parts of the obtained ring-opened copolymer solution was placed in an autoclave, 0.48 parts of carbonyl chlorohydride tris(triphenylphosphine)ruthenium: RuHCl(CO)[P($C_6H_5$)$_3$]$_3$ was added to the ring-opened copolymer solution, and the resulting mixture was then stirred with heating under the conditions of a hydrogen gas pressure of 100 kg/cm$^2$ and at a reaction temperature of 165° C. for 3 hours to perform the hydrogenation reaction.

The reaction solution obtained (hydrogenated polymer solution) was cooled, and the hydrogen gas was released. The reaction solution was poured into a large amount of methanol, an aggregate was separated and recovered, and dried to obtain a hydrogenated polymer (hereinafter, "Resin (a-2)").

The hydrogenation ratio of Resin (a-2) obtained was measured using 400 MHz 1H-NMR spectrum, and was found to be 99.9%.

Furthermore, the ratio of structural unit e derived from bicyclo[2.2.1]hept-2-ene in Resin (a-2) was calculated from measurement of 400 MHz 1H-NMR spectrum and based on the absorption peak appearing in the vicinity of about 3.7 ppm due to protons on methyl of methyl ester of structural unit d derived from 8-methyl-8-methoxycarbonyl-9-methoxycarbonyltetracyclo[4.4.0.1$^{2,5}$.1$^{7,10}$]-3-dodecene, and the absorption peak appearing at 0.15 to 3 ppm due to protons of the alicyclic structure of structural unit d and structural unit e, and found to be 19.4%. Further, a fraction having a polystyrene converted weight average molecular weight Mw of 10,000 or less, a fraction in a range of more than 10,000 and 30,000 or less, and a fraction more than 30,000 were collected by gel permeation chromatography (GPC), and as a result of confirming the ratio of structural unit e in each sample by 400 MHz 1H-NMR spectrum, the variation width for a value of 19.4%, which was the ratio for the entire Resin (a-2), was within 15% for all the samples.

Resin film (a-2) having a residual solution level of 0.4 wt % was manufactured in the same manners as for Film 1, except that Resin (a-2) was used instead of Resin (a-1).

In addition, Resin film (a-2) was heated to 120° C. (Tg+10° C.) within a tenter and stretched by 1.2 times in the longitudinal direction of the film in-plane direction at a stretching speed of 300%/min, subsequently cooled under an atmosphere at 90° C. (Tg−20° C.) for 1 minute while maintaining this state, further cooled at room temperature, and taken out of the tenter to obtain Film 25. The thickness was 25 μm.

[Film 26]

Resin film (a-2) was heated to 120° C. (Tg+10° C.) within a tenter and stretched by 1.05 times in the longitudinal direction of the film in-plane direction at a stretching speed of 300%/min, then stretched by 1.2 times in the transverse direction of the film in-plane direction, subsequently cooled under an atmosphere at 90° C. (Tg−20° C.) for 1 minute while maintaining this state, further cooled at room temperature, and taken out of the tenter to obtain Film 26. The thickness was 25 μm.

[Manufacture of Outer Side Film]
[Films 3 to 24 and 27]
(Acetyl Substitution Degree)

The acetyl substitution degree of cellulose acylate was measured by the following method.

The acetyl substitution degree was measured in accordance with ASTM D-817-91.

(Elastic Modulus in TD Direction)

The elastic modulus of the film was measured by a method described in JIS K7127.

The winding direction of the film roll is defined as a longitudinal direction (MD direction) and a direction orthogonal to the longitudinal direction is defined as a width direction (TD direction). The width direction was set as a measurement direction, and a film sample was cut into a length of 15 cm and a width of 1 cm in the measurement direction. The sample was provided on Strograph V10-C manufactured by TOYO SEIKI KOGYO Co., Ltd., such that the chuck distance in the longitudinal direction was 10 cm, a load was applied thereto such that the chuck distance was widened at a stretching speed of 10 mm/minute, and force at this time was measured. An elastic modulus was calculated from the thickness, the force and the elongation amount of the film measured in advance with a micrometer.

(Humidity Dimensional Change Rate in TD Direction)

The humidity dimensional change rate of the film was measured by the following method.

The winding direction of the film roll is defined as a longitudinal direction (MD direction) and a direction orthogonal to the longitudinal direction is defined as a width direction (TD direction). The width direction was set as a measurement direction, and a film sample was cut into a length of 12 cm and a width of 3 cm in the measurement direction. Along the measurement direction, pin holes are perforated on the sample at an interval of 10 cm, humidity was controlled at 25° C. and a relative humidity of 60% for 24 hours, and then the intervals of pin holes were measured with a pin gauge. Subsequently, humidity was controlled at 25° C. and a relative humidity of 10% for 24 hours, and then the intervals of pin holes were measured with a pin gauge. Subsequently, humidity was controlled at 25° C. and a relative humidity of 80% for 24 hours, and then the intervals of pin holes were measured with a pin gauge. These measurement values were used to calculate the humidity dimensional change rate in the TD direction by the following Equation (1') corresponding to Equation (1).

$$\text{Humidity dimensional change rate (\%) in the } TD \text{ direction} = [\{(\text{intervals of pin holes at } 25° \text{ C. and a relative humidity of } 80\%) - (\text{intervals of pin holes at } 25° \text{ C. and a relative humidity of } 10\%)\}/(\text{intervals of pin holes at } 25° \text{ C. and a relative humidity of } 60\%)] \times 100.$$ Equation (1'):

[Manufacture of Film 3]
(2) Preparation of Dope for Intermediate Layer

Dope 1 for an intermediate layer with the following composition was prepared.

| Composition of Dope 1 | |
|---|---|
| Cellulose acylate (degree of acylation 2.86, degree of polymerization 370) | 100 pars by mass |
| Methylene chloride (first solvent) | 320 parts by mass |
| Methanol (second solvent) | 83 parts by mass |
| 1-butanol (third solvent) | 3 parts by mass |
| Triphenyl phosphate | 7.6 parts by mass |
| Biphenyl diphenyl phosphate | 3.8 parts by mass |

Specifically, the dope was prepared by the following method.

To a 4,000 L stainless steel dissolution tank having a stirring blade, were gradually added a cellulose acetate powder (flake), triphenyl phosphate, and biphenyl diphenyl phosphate while well dispersing the mixture solvent under stirring, and a solution was prepared such that the entire amount was 2,000 kg. Meanwhile, all the solvents with a water content of 0.5% by mass were used. First, the cellulose acetate powder was put into a dispersion tank and dispersed for 30 minutes under the condition of stirring by a dissolver type eccentric stirring shaft, which was stirring at first at a peripheral speed of 5 m/sec (shearing stress: $5 \times 10^4$ kgf/m/sec$^2$) as a stirring shear speed, and a central shaft having anchor blades at a peripheral speed of 1 m/sec (shearing stress: $1 \times 10^4$ kgf/m/sec$^2$), The temperature at the start of the dispersion was 25° C., and finally reached a temperature of 48° C. After completing the dispersion, high speed stirring was stopped, and stirring was further performed at the peripheral speed of the anchor blade of 0.5 m/sec for 100 minutes to swell the cellulose acetate flake. The inside of the tank was pressurized such that the pressure of the tank was 0.12 MPa with a nitrogen gas till the completion of swelling. In this case, the oxygen concentration in the tank was less than 2 vol %, and a state free from the problem in view of explosion protection was maintained. Further, it was confirmed that the water content in the dope was 0.5% by mass or less, and specifically, the water content was 0.3% by mass.

The swollen solution was heated to 50° C. from the tank to the pipeline with a jacket, and then heated up to 90° C. under a pressure of 2 MPa to achieve complete dissolution. The heating time was 15 minutes.

Subsequently, the temperature was lowered to 36° C., and the solution was passed through a filter material having a nominal pore size of 8 μm to obtain a dope. In this case, primary pressure for filtration was set to 1.5 MPa and the second pressure was set to 1.2 MPa. As the filter, the housing and the pipeline exposed to high temperature, those made of Hastelloy alloy excellent in corrosion resistance and having a jacket for allowing a heat medium for temperature keeping and heating to pass therethrough were used.

The dope thus obtained prior to concentration was flushed in a tank at 80° C. under a normal pressure, and the evaporated solvent was recovered and separated by a condenser. The solid concentration of the dope after flushing was 21.8% by mass. Meanwhile, the condensed solvent was returned to the recovering step so as to be reused as a solvent for the preparation step (the recovery is performed by a distillation step, a dehydration step, and the like). The flush tank having anchor blades for the central shaft was used, and defoaming was performed by stirring at a peripheral speed of 0.5 m/sec. The temperature of the dope in the tank was 25° C., and the average retention time in the tank was 50 minutes. The shear viscosity of the dope collected and measured at 25° C. was 450 (Pa·s) at a shearing speed of 10 (sec$^{-1}$).

Subsequently, bubbles were removed by irradiating weak supersonic waves onto the dope. Thereafter, in the first place, the dope was allowed to pass through a sintered fiber metal filter with a nominal pore size of 10 μm in a state under a pressure of 1.5 MPa, and then through a sintered fiber filter of 10 μm size. Respective primary pressures were 1.5 MPa and 1.2 MPa, and respective secondary pressures were 1.0 MPa and 0.8 MPa. The temperature of the dope after filtration was adjusted to 36° C., and the dope was stored in a 2,000 L stock tank made of stainless steel. As the stock tank, those having anchor blades for the central axis were used, and stirring was always conducted at a peripheral speed of 0.3 m/sec to obtain Dope 1 for an intermediate layer. Meanwhile, upon preparing the dope from the dope before concentration, a problem such as corrosion did not occur at all to the dope contact part.

Subsequently, Dope 1 in the stock tank was delivered under feed back control by an inverter motor such that the pressure at the primary side of a high precision gear pump was 0.8 MPa by using a primary pressurization gear pump. The high precision gear pump had a performance of 99.2% of volume efficiency and 0.5% or less of fluctuation in the discharge amount. Further, the discharge pressure was 1.5 MPa.

(2) Preparation of Dope 2 for Support Layer

Dope 2 for a support layer was prepared by mixing a matting agent (silicon dioxide (a particle diameter of 20 nm)), a peeling promoter (ethyl citrate ester (a mixture of citric acid, monoethyl ester, diethyl ester and triethyl ester)) and Dope 1 for an intermediate layer in a stationary mixer. The addition amount was determined such that the total solid concentration was 20.5% by mass, the concentration of the matting agent was 0.05% by mass, and the concentration of the peeling promoter was 0.03% by mass.

(3) Preparation of Dope 3 for Air Layer

Dope 3 for an air layer was prepared by mixing a matting agent (silicon dioxide (a particle diameter of 20 nm)) with Dope 1 for an intermediate layer by a stationary mixer. The addition amount was determined such that the total solid concentration was 20.5% by mass and the concentration of the matting agent was 0.1% by mass.

(4) Film Formation by Co-Casting

As a casting die, a device equipped with a feed block which had a width of 1.8 m and was adjusted for co-casting, and allowing films to be stacked at both sides thereof in addition to the main stream to form a film having a structure of three layers was used. In the following explanation, a layer to be formed from the main stream will be referred to as an intermediate layer, a layer at the side of a support surface will be referred to as a support layer, and the opposite surface will be referred to as an air layer. Meanwhile, the solution sending flow channels of the dope used three flow channels for an intermediate layer, a support layer, and an air layer.

Dope 1 for an intermediate layer, Dope 2 for a support layer and Dope 3 for an air layer were co-cast on a drum cooled to 0° C. from a casting nozzle. In this case, the flow rate of each dope was adjusted such that the ratio of thickness was air layer/intermediate layer/support layer=4/73/3. The cast doping film was dried with dry wind at 30° C. on the drum, and peeled-off from the drum in a state where the residual solvent was 150%. During peeling, 20% of stretching was performed in the conveying direction (the longitudinal direction). In addition, Film 3 was manufactured through further drying by conveying the film between the rolls of heat treatment unit. The amount of residual solvent of the cellulose acylate film manufactured was 0.2%, and the thickness was 25 μm.

Films 4 to 24 and 27 having different thickness, elastic modulus in the TD direction, and humidity dimensional change rate in the TD direction were manufactured in the same manner as in Film 3, except that the flow rate of each dope was adjusted, and the stretching strength in the conveying direction and the stretching magnification in the width direction were adjusted. The thickness, elastic modulus in the TD direction and humidity dimensional change rate in the TD direction, of Films 1 to 27 are shown in Table 1.

TABLE 1

| | Physical Properties of Film | | |
|---|---|---|---|
| Film No. | Thickness (μm) | Elastic modulus in TD direction (GPa) | Humidity dimensional change rate in TD direction (%) |
| Film 1 | 25 | 2.3 | 0.05 |
| Film 2 | 20 | 2.3 | 0.05 |
| Film 3 | 25 | 3.7 | 0.39 |
| Film 4 | 25 | 4.0 | 0.35 |
| Film 5 | 25 | 3.5 | 0.42 |
| Film 6 | 25 | 3.1 | 0.48 |
| Film 7 | 25 | 3.8 | 0.37 |
| Film 8 | 20 | 5.0 | 0.28 |
| Film 9 | 20 | 4.5 | 0.30 |
| Film 10 | 20 | 4.3 | 0.33 |
| Film 11 | 20 | 3.7 | 0.39 |
| Film 12 | 20 | 4.8 | 0.29 |
| Film 13 | 15 | 5.3 | 0.27 |
| Film 14 | 15 | 4.5 | 0.30 |
| Film 15 | 15 | 5.0 | 0.28 |
| Film 16 | 15 | 4.3 | 0.33 |
| Film 17 | 15 | 5.5 | 0.25 |
| Film 18 | 20 | 3.7 | 0.39 |
| Film 19 | 18 | 5.0 | 0.28 |
| Film 20 | 25 | 3.7 | 0.39 |
| Film 21 | 25 | 3.6 | 0.41 |
| Film 22 | 25 | 3.5 | 0.42 |
| Film 23 | 25 | 3.4 | 0.44 |
| Film 24 | 25 | 3.3 | 0.46 |
| Film 25 | 25 | 2.0 | 0.05 |
| Film 26 | 25 | 2.5 | 0.05 |
| Film 27 | 15 | 4.5 | 0.30 |

[Saponification Treatment]

The manufactured inner side film and outer side film were immersed in a sodium hydroxide aqueous solution at 2.3 mol/L at 55° C. for 3 minutes. The films were washed with water in a water-washing bath at room temperature and neutralized at 30° C. using sulfuric acid at 0.05 mol/L. The films were washed with water in the water-washing bath and dried with warm wind at 100° C. By doing so, each film was subjected to surface saponification treatment.

[Preparation of Polarizer 1]

200 kg of water at 18° C. was put into a 500 L tank, 42 kg of a polyvinyl alcohol-based resin having a weight average molecular weight of 165,000 and a saponification degree of 99.8% by mol was added thereto while stirring, and the resulting mixture was stirred for 15 minutes. The slurry obtained was dehydrated to obtain a polyvinyl alcohol-based resin wet cake having a water content of 40%.

70 kg (resin content 42 kg) of the polyvinyl alcohol-based resin wet cake obtained was put into a dissolution tank, 4.2 kg of glycerin as a plasticizer and 10 kg of water were added thereto, and steam was blown into the bottom of the tank. At the time when the resin temperature inside the tank reached 50° C., the resulting mixture was stirred (number of revolutions: 5 rpm), and at the time when the resin temperature inside the tank reached 100° C., the inside of the system was pressurized and the temperature was increased to 150° C., and then the steam blowing was stopped (the amount of steam blown was 75 kg in total). The mixture is uniformly dissolved by stirring the mixture (number of revolutions: 20 rpm) for 30 minutes, and then a polyvinyl alcohol-based resin aqueous solution was obtained at a polyvinyl alcohol-based resin concentration to water of 23% by adjusting the concentration.

Subsequently, the polyvinyl alcohol-based resin aqueous solution (liquid temperature 147° C.) was fed into a twin screw extruder from Gear Pump 1, defoamed, and then discharged by Gear Pump 2. A film was formed by casting the discharged polyvinyl alcohol-based resin aqueous solution onto a cast drum from a T-type slit die (straight manifold die). Conditions of the casting film formation are as follows.

Cast drum diameter (R1): 3,200 mm,
Cast drum width: 4.3 m,
Cast drum rotation speed: 8 m/min,
Cast drum surface temperature: 90° C.,
Resin temperature of T-type slit die exit: 95° C., The front and rear surfaces of the film obtained were dried while being allowed to alternately pass through a plurality of drying rolls under the following conditions.

Drying roll diameter (R2): 320 mm,
Drying roll width: 4.3 m,
Number of drying roll lines (n): 10 lines,
Drying roll rotation speed: 8 m/min,
Drying roll surface temperature: 50° C.

The polyvinyl alcohol film manufactured above (length 4,000 m, width 4 m, and thickness 75 μm) was immersed in warm water at 40° C. for 2 minutes and subjected to swelling treatment, and then stretched by 1.30 times. The film obtained was subjected to dyeing treatment with iodine and iodide by being immersed in an aqueous solution containing 28.6 g/L of boric acid (manufactured by Societa Chimica Larderello s.p.a.), 0.25 g/L of iodine (manufactured by JUNSEI CHEMICAL Co., Ltd.) and 1.0 g/L of potassium iodide (manufactured by JUNSEI CHEMICAL Co., Ltd.) at 30° C. for 2 minutes. The film obtained from the dyeing treatment was subjected to treatment in an aqueous solution containing 30.0 g/L of boric acid at 50° C. for 5 minutes while being uniaxially stretched by 5.0 times. The film obtained was subjected to drying treatment at 70° C. for 9 minutes. Accordingly, a polarizer having a thickness of 30 μm was obtained.

[Preparation of Polarizer 2]

A polyvinyl alcohol film having a length of 4,000 m, a width of 4 m, and a thickness of 63 μm was manufactured in the same manufacturing method as in Polarizer 1, and this film was immersed in warm water at 40° C. for 2 minutes and subjected to swelling treatment, and then stretched by 1.30 times. The film obtained was subjected to dyeing treatment with iodine and iodide by being immersed in an aqueous solution containing 28.6 g/L of boric acid (manufactured by Societa Chimica Larderello s.p.a.), 0.25 g/L of iodine (manufactured by JUNSEI CHEMICAL Co., Ltd.) and 1.0 g/L of potassium iodide (manufactured by JUNSEI CHEMICAL Co., Ltd.) at 30° C. for 2 minutes. The film obtained from the dyeing treatment was subjected to treatment in an aqueous solution containing 30.0 g/L of boric acid at 50° C. for 5 minutes while being uniaxially stretched by 5.0 times. The film obtained was subjected to drying treatment at 70° C. for 9 minutes. Accordingly, a polarizer having a thickness of 25 μm was obtained.

[Preparation of Polarizer 3]

A polyvinyl alcohol film having a length of 4,000 m, a width of 4 m, and a thickness of 50 μm was manufactured in the same manufacturing method as in Polarizers 1 and 2, and this film was immersed in warm water at 40° C. for 2 minutes and subjected to swelling treatment, and then stretched by 1.30 times. The film obtained was subjected to dyeing treatment with iodine and iodide by being immersed in an aqueous solution containing 28.6 g/L of boric acid (manufactured by Societa Chimica Larderello s.p.a.), 0.25 g/L of iodine (manufactured by JUNSEI CHEMICAL Co., Ltd.) and 1.0 g/L of potassium iodide (manufactured by JUNSEI CHEMICAL Co., Ltd.) at 30° C. for 2 minutes. The film obtained from the dyeing treatment was subjected to treatment in an aqueous solution containing 30.0 g/L of boric acid at 50° C. for 5 minutes while being uniaxially stretched by 5.0 times. The film obtained was subjected to drying treatment at 70° C. for 9 minutes. Accordingly, a polarizer having a thickness of 20 μm was obtained.

[Preparation of Adhesion Bond]

10 parts by mass of a polyester-based urethane (manufactured by Mitsui Takeda Chemicals, Inc., Takelac XW-74-C154) and 1 part by mass of an isocyanate-based crosslinking agent (manufactured by Mitsui Takeda Chemicals, Inc., Takenate WD-725) were dissolved in water, and a solution with a solid content adjusted to 20% by mass was prepared. This was used as an adhesion bond.

[Manufacture of Polarizing Plate]

The inner side film manufactured by the method and subjected to saponification treatment was adhered to one side of the polarizer, which was manufactured by the method, using the adhesion bond. Subsequently, the outer side film manufactured by the method and subjected to saponification treatment was adhered to the surface of the polarizer at a side opposite to the side, to which a polarizing plate protective film at the inner side was adhered, using the adhesion bond.

In this case, the absorption axis of the prepared polarizer and the TD direction of protective films at both inner side and outer side were disposed so as to be orthogonal to each other.

By doing this, Polarizing Plate Samples 1 to 30 were manufactured. The configuration of the manufactured polarizing plates is shown in Table 2. The evaluation values obtained by following Equation (2) are described in the table.

$$\text{Evaluation value} = \text{elastic modulus (GPa) of the second protective film in the } TD \text{ direction/humidity dimensional change rate (\%) of the second protective film in the } TD \text{ direction} \times (\text{thickness (μm) of the second protective film/thickness (μm) of the first protective film})^2 \times (30/\text{thickness (μm) of the polarizer})^{1/2} \quad \text{Equation (2):}$$

Here, Films 1, 2, 25 and 26 used as the inner side film are the first protective films, and Films 3 to 24 and 27 used as the outer side film are the second protective films.

[Evaluation of Curls]

The polarizing plate thus manufactured was cut into a size of 15 cm×15 cm, and left to stand under a temperature and humidity environment of 25° C. and a relative humidity of 60% for 4 hours, and then the amount of 4 corners lifted up was measured. The results are shown in Table 2. In this case, the lifted up amount when the outer side was placed so as to be the upper direction was defined as a plus direction. Since in the case where the sample manufactured was warped to the inner side, the lifted up amount may not be measured while the outer side was placed so as to be the upper direction, and thus the amount of the polarizing plate lifted up was measured while the inner side was placed so as to be the upper direction by turning the film up side down, thereby imparting a minus sign.

With respect to whether the average amount of the four corners lifted up was good or bad, the amount of −2 mm or more and less than 4 mm was particularly preferred, and thus defined as A, the amount of −8 mm or more and less than −2 mm or 4 mm or more and less than 16 mm was next preferred, and thus defined as B, and the amount of less than −8 mm or 16 mm or more was not preferred, and thus defined as C.

sized Optical Films 3 to 24 and 27 were subjected to saponification treatment. The optical film subjected to corona treatment and tack film subjected to saponification treatment were adhered to both surfaces of the polarizer by roll-to-roll by means of a roll machine using a polyvinyl alcohol-based adhesion bond, such that the polarizer was sandwiched between the optical film and the tack film, and then the resulting film was dried at 70° C. for 10 minutes or more. In this case, a polarizing plate sample was prepared by selecting a combination of optical films described in Table 2 as the protective film at the air side (viewing side) and the protective film at the cell side. Accordingly, a polarizing plate sample was obtained, in which a film length was 500 m, the absorption axis was in a direction orthogonal to and a slow axis was in a direction orthogonal to the longitudinal direction, and both surfaces thereof were protected by the optical film.

(Adhesion of Laminate Film)

In each polarizing plate sample manufactured, a laminate film (film thickness 38 μm) including polyethylene terephthalate to which adhesive was attached as a main component was adhered to the protective film side at the air side by roll-to-roll by means of a roll machine.

(Formation of Adhesive Layer)

(Preparation of Adhesive)

A solution was prepared by adding 100 parts by mass of isooctyl acrylate, 0.085 part by mass of 6-hydroxyhexyl acry-

TABLE 2

| Polarizing Plate Sample No. | Inner Side Film | Outer Side Film | Thickness of Polarizer (μm) | Evaluation Value of Equation (2) | Evaluation Value of Equation (2') | Average Value of Four Curl Corners | Determination of Curls | Remark |
|---|---|---|---|---|---|---|---|---|
| 1 | Film 1 | Film 3 | 30 | 9.5 | 9.5 | 2 mm | A | Ex. 1 |
| 2 | Film 1 | Film 4 | 30 | 11.4 | 11.4 | −9 mm | C | C. Ex. 1 |
| 3 | Film 1 | Film 5 | 30 | 8.3 | 8.3 | 10 mm | B | Ex. 2 |
| 4 | Film 1 | Film 6 | 30 | 6.5 | 6.5 | 21 mm | C | C. Ex. 2 |
| 5 | Film 1 | Film 7 | 30 | 10.3 | 10.3 | −3 mm | B | Ex. 3 |
| 6 | Film 1 | Film 8 | 30 | 11.4 | 11.4 | −11 mm | C | C. Ex. 3 |
| 7 | Film 1 | Film 9 | 30 | 9.6 | 9.6 | 0 mm | A | Ex. 4 |
| 8 | Film 1 | Film 10 | 30 | 8.3 | 8.3 | 8 mm | B | Ex. 5 |
| 9 | Film 1 | Film 11 | 30 | 6.1 | 6.1 | 21 mm | C | C. Ex. 4 |
| 10 | Film 1 | Film 12 | 30 | 10.6 | 10.6 | −7 mm | B | Ex. 6 |
| 11 | Film 1 | Film 13 | 30 | 10.2 | 10.2 | −5 mm | B | Ex. 7 |
| 12 | Film 1 | Film 14 | 30 | 7.8 | 7.8 | 12 mm | B | Ex. 8 |
| 13 | Film 1 | Film 15 | 30 | 9.3 | 9.3 | 1 mm | A | Ex. 9 |
| 14 | Film 1 | Film 16 | 30 | 6.8 | 6.8 | 18 mm | C | C. Ex. 5 |
| 15 | Film 1 | Film 17 | 30 | 11.4 | 11.4 | −11 mm | C | C. Ex. 6 |
| 16 | Film 2 | Film 18 | 30 | 9.5 | 9.5 | −2 mm | A | Ex. 10 |
| 17 | Film 2 | Film 19 | 30 | 14.5 | 14.5 | −22 mm | C | C. Ex. 7 |
| 18 | Film 1 | Film 20 | 25 | 10.4 | 9.5 | −7 mm | B | Ex. 11 |
| 19 | Film 1 | Film 21 | 25 | 9.6 | 8.8 | −1 mm | A | Ex. 12 |
| 20 | Film 1 | Film 22 | 25 | 9.1 | 8.3 | 3 mm | A | Ex. 13 |
| 21 | Film 1 | Film 23 | 25 | 8.5 | 7.7 | 9 mm | B | Ex. 14 |
| 22 | Film 1 | Film 24 | 25 | 7.9 | 7.2 | 14 mm | B | Ex. 15 |
| 23 | Film 1 | Film 20 | 20 | 11.6 | 9.5 | −13 mm | C | C. Ex. 8 |
| 24 | Film 1 | Film 21 | 20 | 10.8 | 8.8 | −7 mm | B | Ex. 16 |
| 25 | Film 1 | Film 22 | 20 | 10.2 | 8.3 | −2.2 mm | B | Ex. 17 |
| 26 | Film 1 | Film 23 | 20 | 9.5 | 7.7 | 4 mm | A | Ex. 18 |
| 27 | Film 1 | Film 24 | 20 | 8.8 | 7.2 | 11 mm | B | Ex. 19 |
| 28 | Film 25 | Film 7 | 30 | 10.3 | 10.3 | −3 mm | B | Ex. 20 |
| 29 | Film 26 | Film 17 | 30 | 8.8 | 8.8 | 13 mm | B | Ex. 21 |
| 30 | Film 2 | Film 27 | 20 | 10.3 | 8.4 | 14 mm | B | Ex. 22 |

The present Examples relate to a form in which there is no hard coat layer on the surface at the outer side, but it is thought that the case where there is a hard coat layer on the surface shows the same tendency.

[Manufacture of Polarizing Plate Sample by Roll-to-Roll]

Long-sized Optical Films 1, 2, 25 and 26 were manufactured by the aforementioned method, and the surfaces thereof were subjected to corona treatment. Subsequently, the longlate, 0.4 part by mass of 2,2'-azobisisobutyronitrile, and ethyl acetate to a reaction vessel equipped with a cooling tube, a nitrogen introducing tube, a thermometer and a stirring device. Subsequently, the solution was stirred while nitrogen gas was blown thereinto, and was reacted at 60° C. for 4 hours to obtain a solution containing an acrylic polymer PA having a weight average molecular weight of 1,750,000. Furthermore, an acrylic polymer solution adjusted to have a solid content concentration of 30% by mass was obtained by adding ethyl acetate to the solution containing the acrylic polymer PA.

An adhesive solution was prepared by blending 2.5 parts by mass of a crosslinking agent (manufactured by Nippon Polyurethane Industry Co., Ltd., trade name "Coronate L") including a compound containing an isocyanate group as a main component and 0.02 part by mass of γ-glycidoxypropyltrimethoxy silane (Shin-Etsu Chemical Co., Ltd., trade name "KBM-403") as a silane coupling agent in this order, based on 100 parts by mass of a solid content of the acrylic polymer solution.

(Formation of Adhesive Layer)

The adhesive solution was uniformly coated on the protective film side at the cell side of the polarizing plate sample manufactured by means of a slot die coater, and the resulting sample was allowed to pass through an air circulation-type constant temperature bath at 155° C. for 5 minutes, thereby forming an adhesive layer having a thickness of 15 μm on the surface of the polarizing plate. On the adhesive layer formed, a separate film (film thickness 38 μm) including polyethylene terephthalate as a main component was adhered by roll-to-roll by means of a roll machine.

(Punching of Polarizing Plate)

The polarizing plate manufactured was punched into the following size in order to be adhered to a 42-inch liquid crystal display device.

Front Side
MD direction 929.8 mm
TD direction 523.0 mm
Rear Side
MD direction 523.0 mm
TD direction 929.8 mm The polarizing plate punched into the size was introduced into an aluminum moisture barrier bag (manufactured by ADY Ltd.), and hermetically sealed with a heat sealer set to a temperature of 180° C. The aluminum moisture barrier bag which enclosed the polarizing plate was stored under an environment of a temperature of 25° C.

[Manufacture of Liquid Crystal Display Device]

A liquid crystal cell for an experiment was prepared by peeling off each polarizing plate at the front side and the rear side from a commercially available IPS-type liquid crystal television set (42LA6900 manufactured by LG Electronics Corp.). Thereafter, a separate film was peeled-off from the polarizing plate, and the polarizing plate was adhered each at the front side and the rear side of the liquid crystal cell prepared. The crossed Nichol was disposed such that the absorption axis of the polarizing plate at the front side was in the longitudinal direction (crosswise direction) and the transmission axis of the polarizing plate at the rear side was in the longitudinal direction (crosswise direction). Further, in this case, for the environment, the temperature was 25° C. and the relative humidity was 60%. In the liquid crystal display device manufactured by adhering the polarizing plate, which was good in curls in Table 2, to the liquid crystal cell, bubbles were incorporated in a small amount into the ends of the polarizing plate and the appearance was aesthetically good.

INDUSTRIAL APPLICABILITY

According to the present invention, it is possible to obtain a polarizing plate which is excellent in processing suitability of a polarizing plate, and is also excellent in manufacturing suitability of a liquid crystal display device in spite of a thin film from the viewpoint of curls.

Although the present invention has been described in detail with reference to detailed and specific embodiments, it is obvious to those skilled in the art that various changes or modifications can be made without departing from the spirit and scope of the present invention.

The present application is based on Japanese Patent Application (Patent Application No. 2012-167653) filed on Jul. 27, 2012, the content of which is incorporated herein by reference.

REFERENCE SIGNS LIST

1: First protective film
2: Second protective film
3: Polarizer
10: Polarizing plate
11: TD direction of first protective film
12: TD direction of second protective film
13: Absorption axis of polarizer
20: Liquid crystal cell
100: Liquid crystal display device

What is claimed is:

1. A polarizing plate comprising: a first protective film, a polarizer, and a second protective film in this order,
wherein the first protective film is a film containing a synthetic polymer, and has a thickness of 30 μm or less, an elastic modulus in a TD direction of 2 GPa to 2.5 GPa, and a humidity dimensional change rate in the TD direction, which is represented by Equation (1), of 0.1% or less, and
the second protective film has an evaluation value represented by Equation (2) of 7.0 to 11.0:

Humidity dimensional change rate (%) in the $TD$ direction=[{(length of a film in the $TD$ direction at 25° C. and a relative humidity of 80%)−(length of a film in the $TD$ direction at 25° C. and a relative humidity of 10%)}/(length of a film in the $TD$ direction at 25° C. and a relative humidity of 60%)]×100     Equation (1), and Evaluation value=elastic modulus (GPa) of the second protective film in $a$ $TD$ direction/humidity dimensional change rate (%) of the second protective film in the $TD$ direction×(thickness (μm) of the second protective film/thickness (μm) of the first protective film)$^2$×(30/thickness (μm) of the polarizer)$^{1/2}$     Equation(2).

2. The polarizing plate according to claim 1,
wherein the second protective film is a film containing cellulose acylate.

3. The polarizing plate according to claim 1,
wherein the synthetic polymer contained in the first protective film is a cycloolefin-based polymer.

4. The polarizing plate according to claim 1,
wherein the evaluation value represented by Equation (2) is 9.0 to 10.0.

5. The polarizing plate according to claim 1,
wherein the polarizing plate has a thickness of 80 μm or less.

6. A liquid crystal display device comprising: a liquid crystal cell; and at least one of the polarizing plate according claim 1,
wherein the first protective film in the polarizing plate is disposed at a liquid crystal cell side.

7. A polarizing plate comprising: a first protective film, a polarizer, and a second protective film in this order,
wherein the first protective film is a film containing a synthetic polymer, and has a thickness of 30 μm or less and an elastic modulus in a TD direction of 2.0 GPa to 2.5 GPa,
the polarizer has a thickness of 20 μm, and the second protective film has an evaluation value A represented by Equation (2') of 5.7 to 9.0:

Evaluation value $A$ = elastic modulus (GPa) of the second protective film in a TD direction/humidity dimensional change rate (%) of the second protective film in the TD direction × (thickness (μm) of the second protective film/thickness (μm) of the first protective film)$^2$     Equation (2').

8. A liquid crystal display device comprising: a liquid crystal cell; and at least one of the polarizing plate according claim 7,
wherein the first protective film in the polarizing plate is disposed at a liquid crystal cell side.

9. A polarizing plate comprising: a first protective film, a polarizer, and a second protective film in this order,
wherein the first protective film is a film containing a synthetic polymer, and has a thickness of 30 μm or less and an elastic modulus in a TD direction of 2.0 GPa to 2.5 GPa,
the polarizer has a thickness of 25 μm, and
the second protective film has an evaluation value A represented by Equation (2') of 6.5 to 10.0:

Evaluation value $A$ = elastic modulus (GPa) of the second protective film in a TD direction/humidity dimensional change rate (%) of the second protective film in the TD direction × (thickness (μm) of the second protective film/thickness (μm) of the first protective film)$^2$     Equation (2').

10. A liquid crystal display device comprising: a liquid crystal cell; and at least one of the polarizing plate according claim 9,
wherein the first protective film in the polarizing plate is disposed at a liquid crystal cell side.

11. A polarizing plate comprising: a first protective film, a polarizer, and a second protective film in this order,
wherein the first protective film is a film containing a synthetic polymer, and has a thickness of 30 μm or less and an elastic modulus in a TD direction of 2.0 GPa to 2.5 GPa,
the polarizer has a thickness of 30 μm, and
the second protective film has an evaluation value A represented by Equation (2') of 7.0 to 11.0:

Evaluation value $A$ = elastic modulus (GPa) of the second protective film in a TD direction/humidity dimensional change rate (%) of the second protective film in the TD direction × (thickness (μm) of the second protective film/thickness (μm) of the first protective film)$^2$     Equation (2').

12. A liquid crystal display device comprising: a liquid crystal cell; and at least one of the polarizing plate according claim 11,
wherein the first protective film in the polarizing plate is disposed at a liquid crystal cell side.

* * * * *